US012600427B2

(12) United States Patent
Zheng et al.

(10) Patent No.: US 12,600,427 B2
(45) Date of Patent: Apr. 14, 2026

(54) ALL-TERRAIN VEHICLE

(71) Applicant: Zhejiang CFMOTO Power Co., Ltd., Hangzhou (CN)

(72) Inventors: Hanfeng Zheng, Hangzhou (CN); Jiajun Li, Hangzhou (CN); Zhibin Cao, Hangzhou (CN); Han Cao, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 278 days.

(21) Appl. No.: 18/397,867

(22) Filed: Dec. 27, 2023

(65) Prior Publication Data

US 2024/0140558 A1 May 2, 2024

Related U.S. Application Data

(63) Continuation of application No. PCT/CN2021/143246, filed on Dec. 30, 2021.

(30) Foreign Application Priority Data

Sep. 28, 2021 (CN) .......................... 202111146655.6

(51) Int. Cl.
  *B62K 5/01* (2013.01)
  *B62J 1/08* (2006.01)
  (Continued)

(52) U.S. Cl.
  CPC *B62K 5/01* (2013.01); *B62J 1/08* (2013.01); *B62J 1/12* (2013.01); *B62J 33/00* (2013.01);
  (Continued)

(58) Field of Classification Search
  CPC .... B62K 5/01; B62K 2005/001; B62K 19/00; B62K 19/30; B62K 25/20; B62J 1/08;
  (Continued)

(56) References Cited

U.S. PATENT DOCUMENTS 5,107,952 A * 4/1992 Matsubayashi .......... B62K 5/01
180/215
6,161,892 A 12/2000 Chabanne et al.
(Continued)

FOREIGN PATENT DOCUMENTS

CA 1216800 A 1/1987
CA 2619874 A1 3/2006
(Continued)

*Primary Examiner* — Timothy Hannon
(74) *Attorney, Agent, or Firm* — Shewchuk IP Services, LLC; Jeffrey D. Shewchuk

(57) ABSTRACT

An all-terrain vehicle includes a frame, wheels, a vehicle cover, a power supply system a saddle assembly, a brake system, a drive assembly and a suspension system. The all-terrain vehicle is sized for children to ride, with numerous disclosed modifications in accordance with its size and riders. For instance, the saddle assembly includes a locking hook accessible from the rear of the vehicle, and in the locked state holds the main power supply down into its compartment. The brake system uses a pawl for two handed setting of the parking brake. The instrument assembly allows adjustment of the display angle of the display screen. The charger cover uses a damping block to cause the cover to hover at a selected position. The all-terrain vehicle can meet the use needs and safety requirements of all-terrain vehicles for kids, and can ensure the safety of drivers.

18 Claims, 27 Drawing Sheets

(51) Int. Cl.

| | |
|---|---|
| *B62J 1/12* | (2006.01) |
| *B62J 33/00* | (2006.01) |
| *B62J 43/16* | (2020.01) |
| *B62J 43/20* | (2020.01) |
| *B62K 19/30* | (2006.01) |
| *B62K 25/20* | (2006.01) |
| *B62L 1/00* | (2006.01) |
| *B62L 3/02* | (2006.01) |
| *B62L 3/04* | (2006.01) |
| *B62L 3/08* | (2006.01) |
| *B62M 7/02* | (2006.01) |
| B62J 3/14 | (2020.01) |
| B62J 43/28 | (2020.01) |
| B62J 50/22 | (2020.01) |
| B62K 5/00 | (2013.01) |

(52) U.S. Cl.

CPC .............. *B62J 43/16* (2020.02); *B62J 43/20* (2020.02); *B62K 19/30* (2013.01); *B62K 25/20* (2013.01); *B62L 1/005* (2013.01); *B62L 3/023* (2013.01); *B62L 3/04* (2013.01); *B62L 3/08* (2013.01); *B62M 7/02* (2013.01); *B62J 3/14* (2020.02); *B62J 43/28* (2020.02); *B62J 50/22* (2020.02); *B62K 2005/001* (2013.01)

(58) Field of Classification Search

CPC ..... B62J 1/12; B62J 33/00; B62J 43/16; B62J 43/20; B62J 43/28; B62J 50/22; B62J 23/00; B62M 7/02

USPC ........................................................ 180/60

See application file for complete search history.

(56) References Cited

U.S. PATENT DOCUMENTS

| | | | | |
|---|---|---|---|---|
| 6,186,256 | B1 * | 2/2001 | Dignitti | H01M 50/271 |
| | | | | 24/546 |
| 6,296,073 | B1 | 10/2001 | Rioux et al. | |
| 6,547,027 | B1 * | 4/2003 | Kalhok | B62J 1/12 |
| | | | | 180/215 |
| 7,178,866 | B1 * | 2/2007 | Scott | B62J 1/12 |
| | | | | 297/180.12 |

| | | | |
|---|---|---|---|
| 10,611,425 | B2 | 4/2020 | Miyashiro et al. |
| 11,400,994 | B2 | 8/2022 | Okabe et al. |
| 11,634,196 | B2 | 4/2023 | Begin et al. |
| 11,731,720 | B2 | 8/2023 | Zhang |
| 2002/0007978 | A1 | 1/2002 | Suzuki |
| 2004/0140146 | A1 | 7/2004 | Maeda et al. |
| 2010/0043589 | A1 | 2/2010 | Chandran et al. |
| 2010/0084212 | A1 | 4/2010 | Smith et al. |
| 2010/0210417 | A1 | 8/2010 | Lin et al. |
| 2010/0216372 | A1 | 8/2010 | Sitarski et al. |
| 2011/0094816 | A1 | 4/2011 | Suzuki et al. |
| 2011/0239812 | A1 | 10/2011 | Gutierrez Fernandez |
| 2014/0000406 | A1 | 1/2014 | Domkowski |
| 2015/0232150 | A1 | 8/2015 | Kosuge et al. |
| 2016/0318579 | A1 | 11/2016 | Miyashiro |
| 2019/0135373 | A1 | 5/2019 | Hengst |
| 2019/0152556 | A1 | 5/2019 | Yamamoto et al. |
| 2020/0277016 | A1 | 9/2020 | Kobayashi et al. |
| 2020/0407005 | A1 | 12/2020 | Shirasuna et al. |
| 2022/0136292 | A1 | 5/2022 | Sun |
| 2022/0177063 | A1 | 6/2022 | Wakimoto |
| 2023/0234460 | A1 | 7/2023 | Liu et al. |

FOREIGN PATENT DOCUMENTS

| | | | |
|---|---|---|---|
| CN | 1412054 | A | 4/2003 |
| CN | 101823534 | A | 9/2010 |
| CN | 201647057 | U | 11/2010 |
| CN | 103950436 | A | 7/2014 |
| CN | 205952219 | U | 2/2017 |
| CN | 207449881 | U | 6/2018 |
| CN | 209817700 | U | 12/2019 |
| CN | 210391424 | U | 4/2020 |
| CN | 211223301 | U | 8/2020 |
| CN | 111902339 | A | 11/2020 |
| CN | 112874671 | A | 6/2021 |
| DE | 102020131556 | A1 | 6/2021 |
| EP | 3747681 | A1 | 12/2020 |
| GB | 2531590 | A | 4/2016 |
| JP | H01178093 | A | 7/1989 |
| JP | 2006069506 | A | 3/2006 |
| JP | 2006096142 | A | 4/2006 |
| JP | 2006327323 | A | 12/2006 |
| JP | 2008278644 | A | 11/2008 |
| WO | 2017041852 | A1 | 3/2017 |

* cited by examiner

101

153

1531

1532

1533

100

L₃

15

132

H₅

153

ALL-TERRAIN VEHICLE

RELATED APPLICATION INFORMATION

The present application is a continuation of PCT/ CN2021/143246 filed Dec. 30, 2021, which claims the benefits of priority to Chinese Patent Application No. CN202111146655.6, filed with the Chinese Patent Office on Sep. 28, 2021. The entire contents of the above-referenced application are incorporated herein by reference.

FIELD OF THE DISCLOSURE

The invention relates to the field of vehicles, and in particular to an all-terrain vehicle.

BACKGROUND OF THE DISCLOSURE

All-terrain vehicles are increasingly popular for their entertainment properties with the improvement of people's living standards. The market and demand for all-terrain vehicles for children are also increasing. Existing all-terrain vehicles for children are simply reduced in size from adult all-terrain vehicles, and most all-terrain vehicles for children are entirely hydrocarbon fuel powered with poor controllability and environmental protection. Solutions which better adapt all-terrain vehicles for the needs of children are needed.

SUMMARY OF THE INVENTION

In view of this, the disclosure provides an all-terrain vehicle, which has good controllability and environmental protection, and can meet the needs of all-terrain vehicles for kids.

The disclosure provides an all-terrain vehicle. The all-terrain vehicle includes a frame, a vehicle cover, a plurality of wheels, a drive system, a saddle assembly, a power supply system, and a suspension system. The frame includes a frame body. The vehicle cover is at least partially connected to the frame. The plurality of wheels includes two rear wheels and two front wheels. The drive system includes a drive motor for driving at least one of the rear wheels and the front wheels. The saddle assembly is arranged on the frame. The power supply system is at least partially located below the saddle assembly and includes a main power supply for supplying power to the drive system. The suspension system includes a front suspension and a rear suspension, with the rear wheels connected to the frame by the rear suspension and the front wheels connected to the frame by the front suspension. The rear suspension includes a rear rocker arm. The saddle assembly is locked on the frame in a saddle locked state and is unlocked on the frame in a saddle unlocked state. The main power supply is fixed below the saddle assembly when the saddle assembly is in the saddle locked state, pressed downwardly into a main power supply compartment by a power supply stopper of the saddle assembly. The saddle assembly includes a saddle substantially extending in a front-rear direction, and a ratio of a length of the saddle to a length of the all-terrain vehicle is in the range from 0.3 to 0.48. A fully loaded pivot arm angle is in the range from 90° to 135° relative to vertical and a fully loaded rear drive angle is in the range from 90° to 120° relative to vertical. Various other positional relationships are defined in accordance with the child-sized vehicle.

In one aspect, the brake system includes a handbrake assembly with a limiting pawl that allows two handed setting of the parking brake. A control unit receives a signal indicating the position of the limiting pawl, and modifies operation of the vehicle when the parking brake is set. In another aspect, the saddle assembly is secured in a saddle locked state by a locking hook accessible from behind the all-terrain vehicle, and the saddle assembly has a power supply stopper which holds the main power supply downwardly into is power supply compartment when the saddle assembly is in the saddle locked state, allowing easy access to and removal of the main power supply by unlatching the saddle locking hook and moving the saddle assembly. Other modifications of the frame, the suspension, the drive motor attachment, the charger cover, the lamps and the instrument assembly are disclosed to facilitate assembly, use and/or maintenance of the child-sized all-terrain vehicle.

DETAILED DESCRIPTION

The following will provide a detailed description of the present invention in conjunction with the specific embodiment shown in the accompanying drawings, but the embodiment shown and the embodiments discussed do not limit the present invention. Structural, method, or functional changes may be made by ordinary technical personnel in the art based on these disclosed embodiments, and such changed embodiments are also included in the scope of protection of the present invention.

Figure 1:
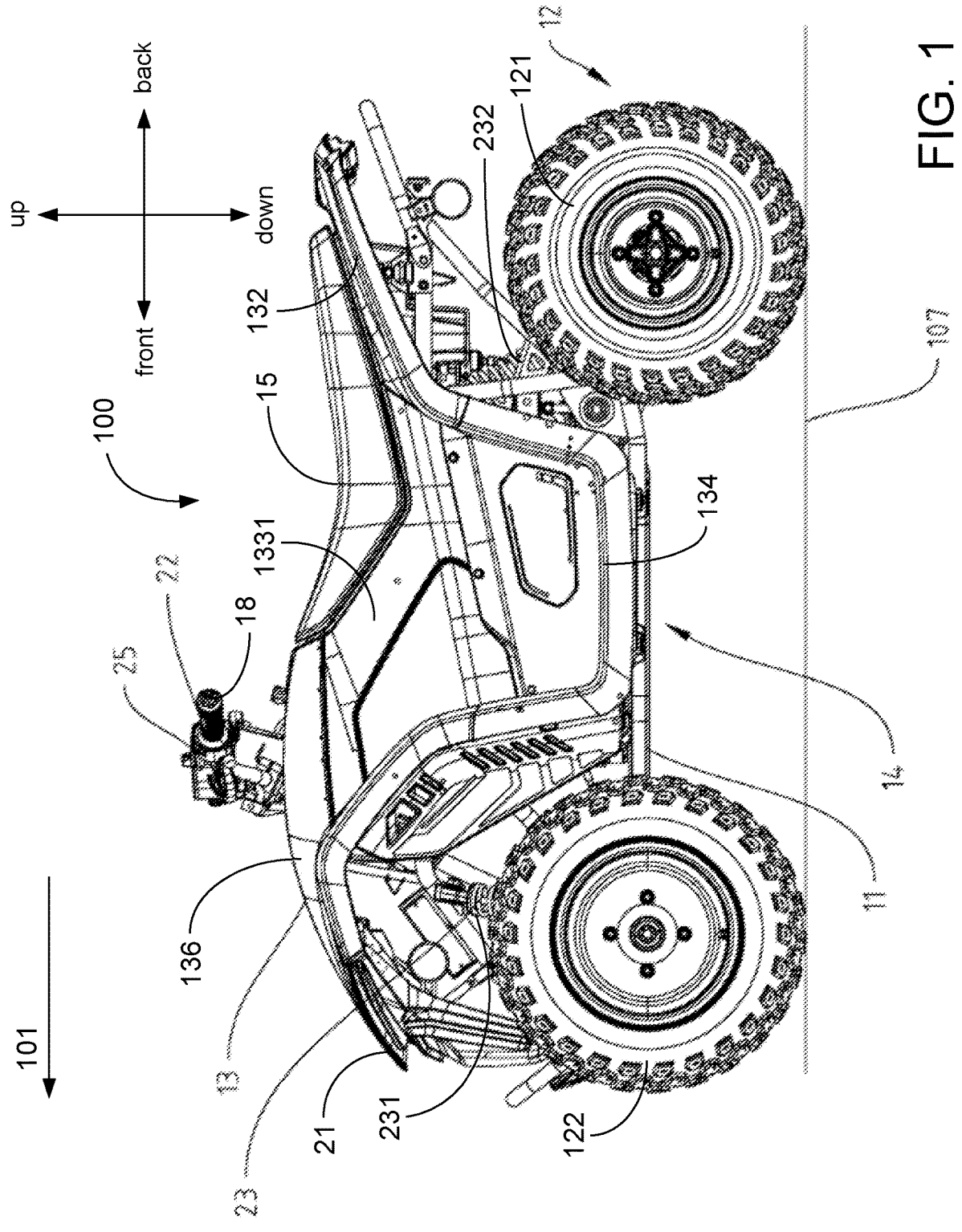
FIG. 1 is a side view of an all-terrain vehicle in accordance with a preferred embodiment of the disclosure, showing the charger cover in an open position.
Figure 2:
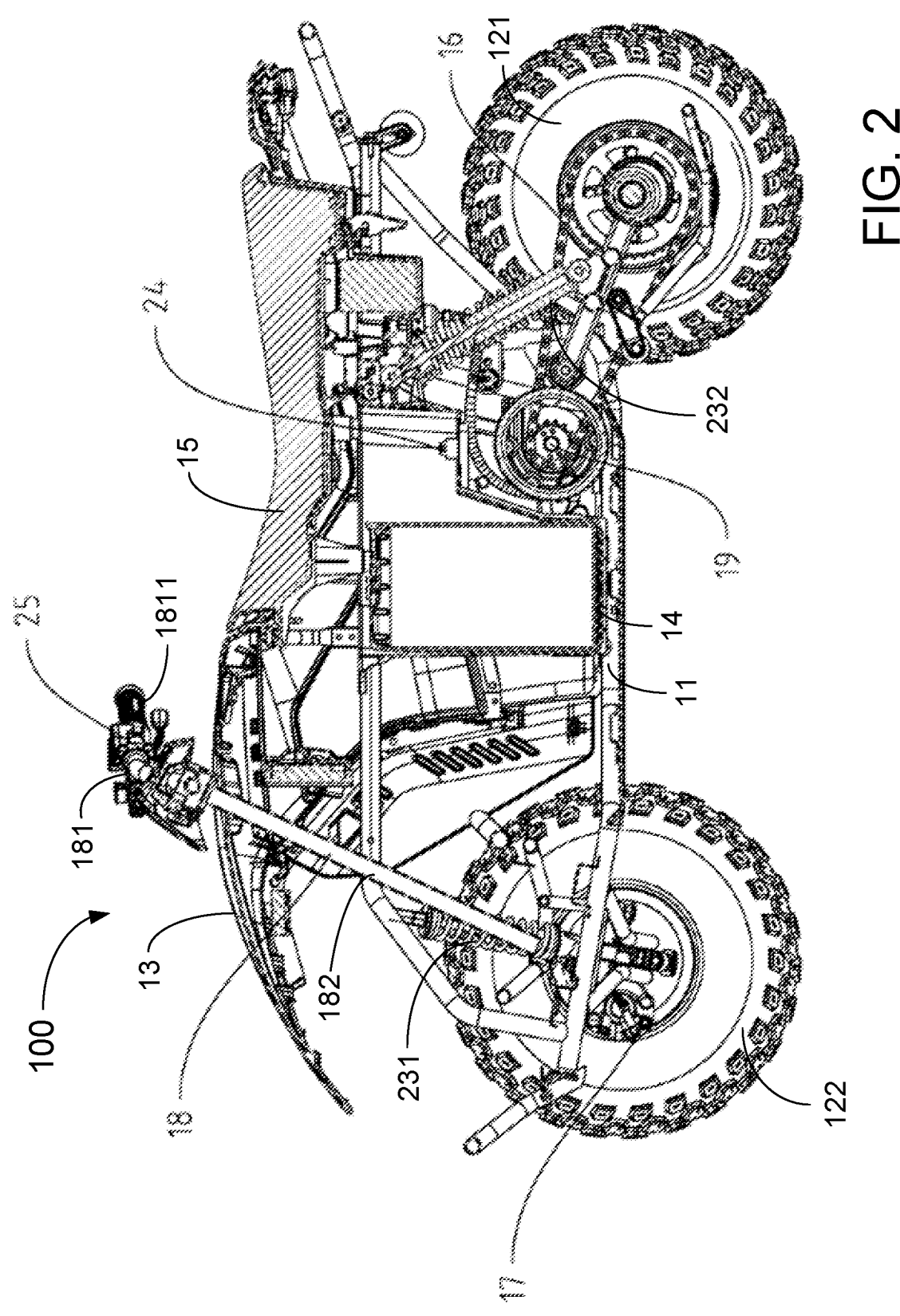
FIG. 2 is a cross-sectional view of the all-terrain vehicle of FIG. 1 taken along the longitudinal vertical center plane, with the charger cover in a closed position.
Figure 3:
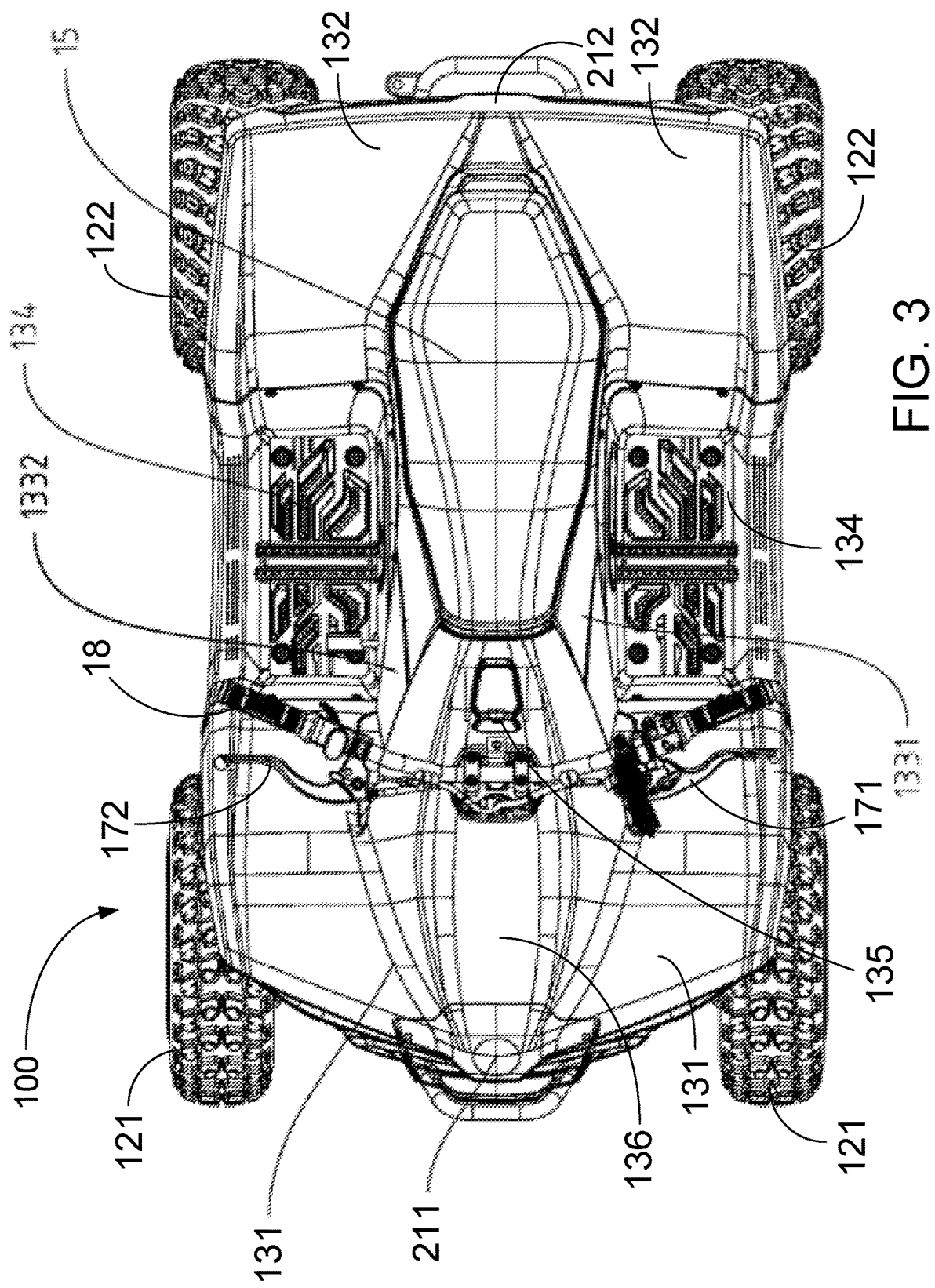
FIG. 3 is a top plan view of the all-terrain vehicle of FIGS. 1 and 2, omitting the instrument assembly and showing the charger cover in an open position.

As shown in FIGS. 1 to 3, a reduced size all-terrain vehicle 100 includes a frame 11, a plurality of wheels 12, a vehicle cover 13, a power supply system 14, a saddle assembly 15, a transmission assembly 16, a brake system 17, a steering assembly 18, a drive assembly 19, a plurality of lamps 21, a drive control assembly 22, a suspension system 23, a control unit 24 and an instrument assembly 25. The general orientations of front, back (rear), up (upper), and down (lower) for the all-terrain vehicle are defined in FIG. 1, and left and right are defined as riding on the vehicle looking forward. The frame 11 supports the vehicle cover 13, both of a size for a child's all-terrain vehicle 100 and smaller than frames and vehicle covers of adult sized all-terrain vehicles. The plurality of wheels 12 are located below the frame 11 and drive the all-terrain vehicle 100 to move. As called out in FIG. 3, the vehicle cover 13 preferably includes at least a front fender 131 and a rear fender 132 helping to protect the driver from spray from the wheels 12. The plurality of wheels 12 include two rear wheels 121 preferably used as drive wheels and two front wheels 122 used as driven wheels, i.e. the vehicle 100 is preferably a rear wheel drive vehicle. The saddle assembly 15 is mounted above the frame 11 for the driver to ride on. The power supply system 14, preferably for providing electrical power for the all-terrain vehicle 100, is mounted on the frame 11 below the saddle assembly 15. The drive system 19 is electrically connected to the power supply system 14, preferably mounted on the frame 11 (for rear wheel drive) adjacent to the rear wheels 121. The drive system 19 drives at least one of the rear wheels 121 (more preferably) or the front wheels 122 (less preferably) to provide driving force to drive the all-terrain vehicle 100 to move. The suspension system 23 includes components which are pivotally attached to the frame 11 so as to support the frame 11 from the wheels 12. The suspension system 23 includes a front suspension 231 for the front wheels 122 and a rear suspension 232 for the rear wheels 121. The steering assembly 18, preferably including a handlebar 181 as called out in FIG. 2, is connected to the front suspension 231 of the suspension system 23 and is pivoted to the frame 11 to control the driving direction of the front wheels 122 and of the all-terrain vehicle 100. The drive control assembly 22 is mounted near the steering assembly 18 and is used to control the driving state of the all-terrain vehicle 100. The instrument assembly 25 for displaying relevant data during the running of the all-terrain vehicle 100 is mounted in a front position of the vehicle 100 that can be seen by the user. The plurality of lamps 21 are mounted at the front end and rear end of the frame 11 to provide lighting signals and to provide light in the path of the vehicle 100 for operating the vehicle 100 after dark. The control unit 24 controls the running status of the all-terrain vehicle 100.

A ground reference plane 107 is defined as a horizontal plane where the wheels/tires 12 contact the ground. A forward direction 101 is defined as a direction parallel to the ground reference plane 107 and extending from rear to front along the all-terrain vehicle 100.

Figure 4:
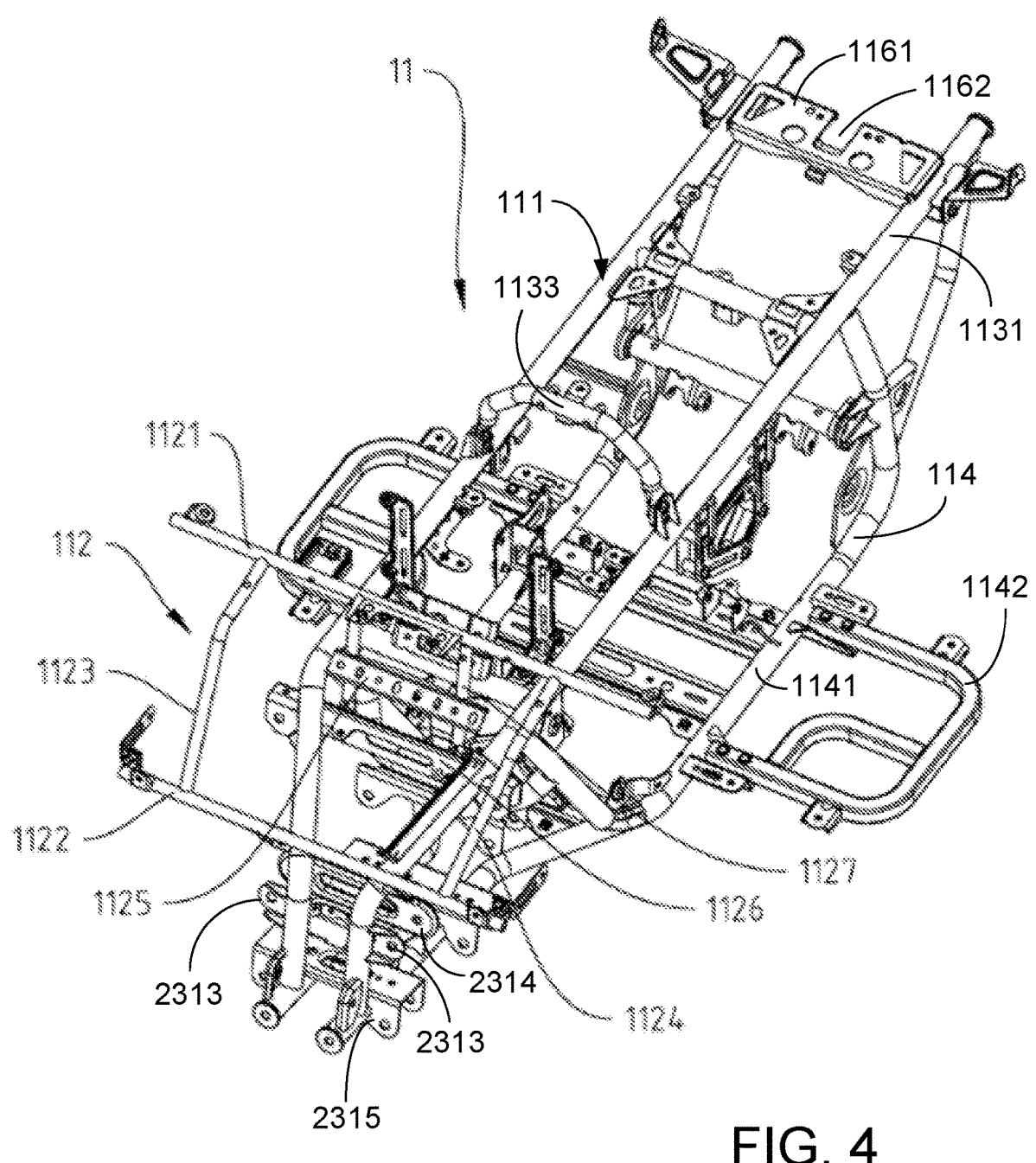
FIG. 4 is a front left perspective view of a frame of the all-terrain vehicle of FIGS. 1-3.

As better shown in FIG. 4, the frame 11 including a frame body 111 and a front bracket 112 fixedly connected to the front end of the frame body 111 for supporting the front end of the vehicle cover 13. The front bracket 112 is shown in FIGS. 4, 5, 9 and 37, but is omitted in the remaining figures to better show the frame body 111. The front bracket 112 includes an upper-front cross bar 1121 mounted on the upper-front end of the frame body 111, a lower-front cross bar 1122 mounted on the lower-front end of the frame body 111, and a left bent tube 1123 and a right bent tube 1124 both running between the upper-front cross bar 1121 and the lower-front cross bar 1122 and both matched with the shape of the front end of the vehicle cover 13. Two ends of the left bent tube 1123 are respectively welded to the upper-front cross bar 1121 and the lower-front cross bar 1122, and two ends of the right bent tube 1124 are respectively welded to the upper-front cross bar 1121 and the lower-front cross bar 1122. In this way, the left bent tube 1123, the right bent tube 1124, a portion of the upper-front cross bar 1121 and a portion of the lower-front cross bar 1122 cooperatively define a closed installation area. An electrical unit mount seat 1125 is arranged within the closed installation area for installing one or more electrical units 213 (shown only in FIG. 5). The electrical unit mount seat 1125 is preferably arranged just below and parallel to the upper-front cross bar 1121 within the installation area. At least one and more preferably two vertical rods 1127 are arranged on the upper-front cross bar 1121 extending towards the ground reference plane 107 to a front bracket mount seat 1126, with the front bracket mount seat 1126 supporting the front bracket 112 from the frame body 111. The electrical unit mount seat 1125 is preferably supported by the vertical rod(s) 1127 above the front bracket mount seat 1126.

Figure 5:
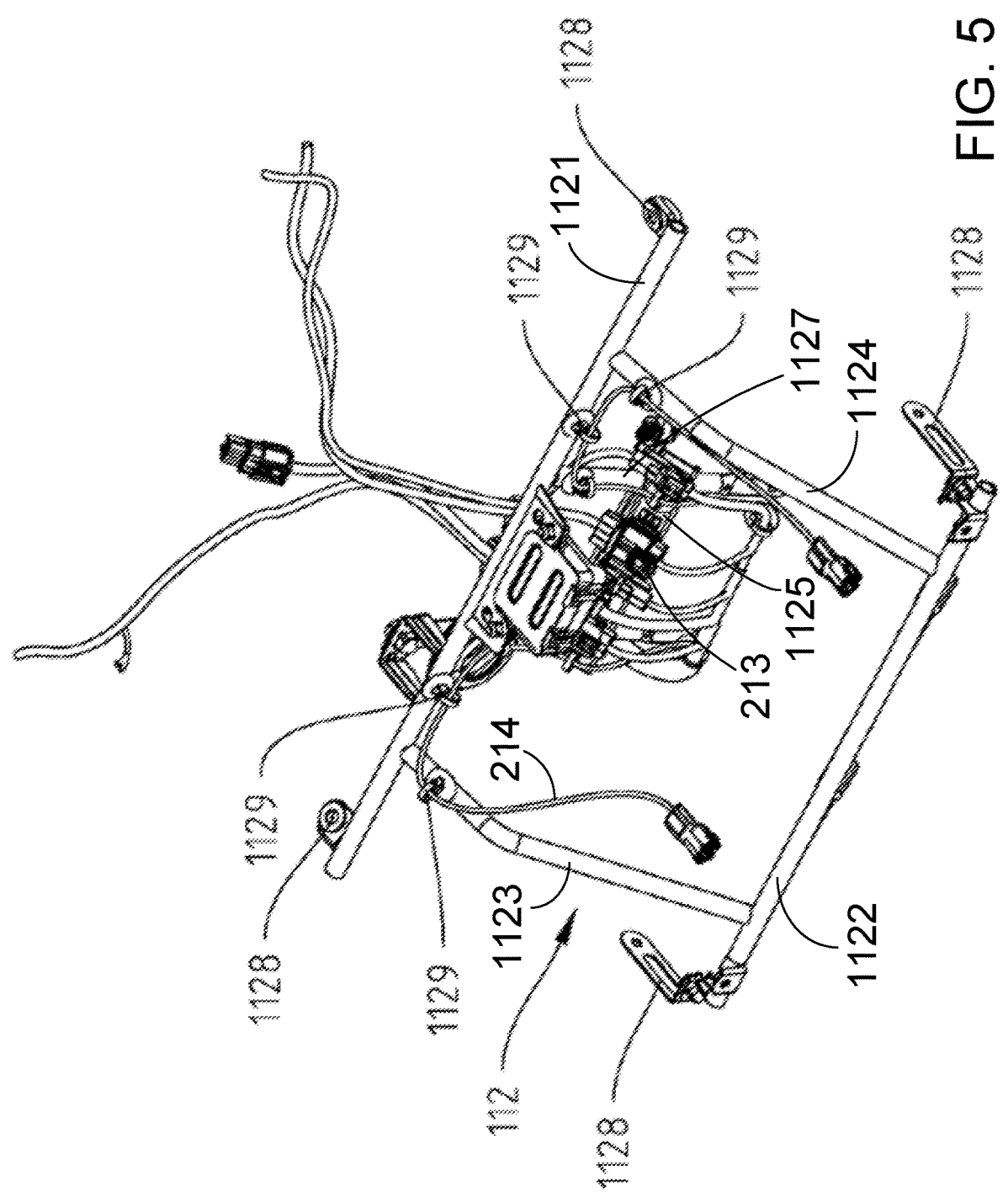
FIG. 5 a front left perspective view of a front bracket of the frame of FIG. 4, also showing an electrical unit and its cables.
Figure 6:
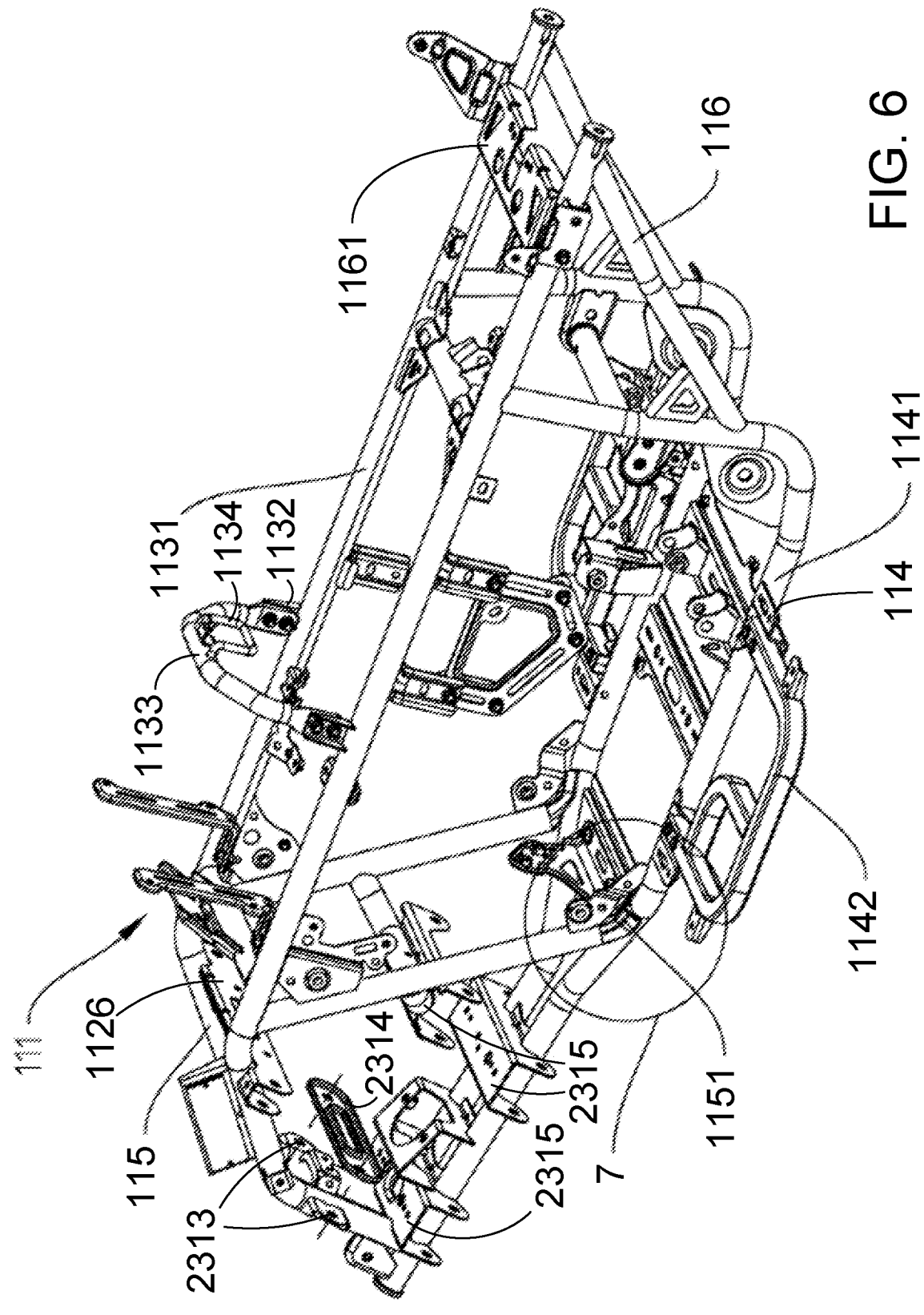
FIG. 6 is a rear left perspective view of the frame of FIG. 4, not showing the front bracket.

FIG. 5 better shows portions of the front bracket 112 without showing the remainder of the frame 11. A plurality of cable fixing devices 1129 for fixing cables 214 are preferably arranged on the upper-front cross bar 1121, the left bent tube 1123 and the right bent tube 1124 around the installation area. A plurality of mount holes 1128 are defined at two ends of the upper-front cross bar 1121 and two ends of the lower-front cross bar 1122. The front end of the vehicle cover 13 is secured to the front bracket 112 through the mount holes 1128 defined at two ends of the upper-front cross bar 1121 and two ends of the lower-front cross bar 1122. The front bracket 112 as shown in FIG. 5 and the frame body 111 as shown in FIG. 6 are preferably separately formed/welded as two independent structures, which makes the transport and placement of the frame body 111 easier before the assembly of the vehicle cover 13 to the all-terrain vehicle 100. A front end of the frame body 111 supports the front bracket 112, and the front bracket 112 effectively improves support strength for the vehicle cover 13 and avoids the collapse of vehicle cover 13 at the front end. Cables 214 from the electrical unit 213 are fixed through the front bracket mounting seat 1126, and then the cables 214 are led out to the outside through the cable fixing device 1129, which makes the cable layout more standardized and reasonable, further improving the convenience of electrical unit maintenance.

As called out in FIG. 6, the frame body 111 includes a top horizontal section 113, a bottom horizontal section 114, a front section 115 arranged at the front end of the all-terrain vehicle 100, and a rear section 116 arranged at the rear end of the all-terrain vehicle 100. In the preferred embodiment, two top main beams 1131 are symmetrically arranged to form the top horizontal section 113 and two bottom beams 1141 are symmetrically arranged as part of the bottom horizontal section 114. The rear section 116 includes a rear cross-plate 1161, which is further discussed below associated with locking of the saddle assembly 15.

Figure 7:
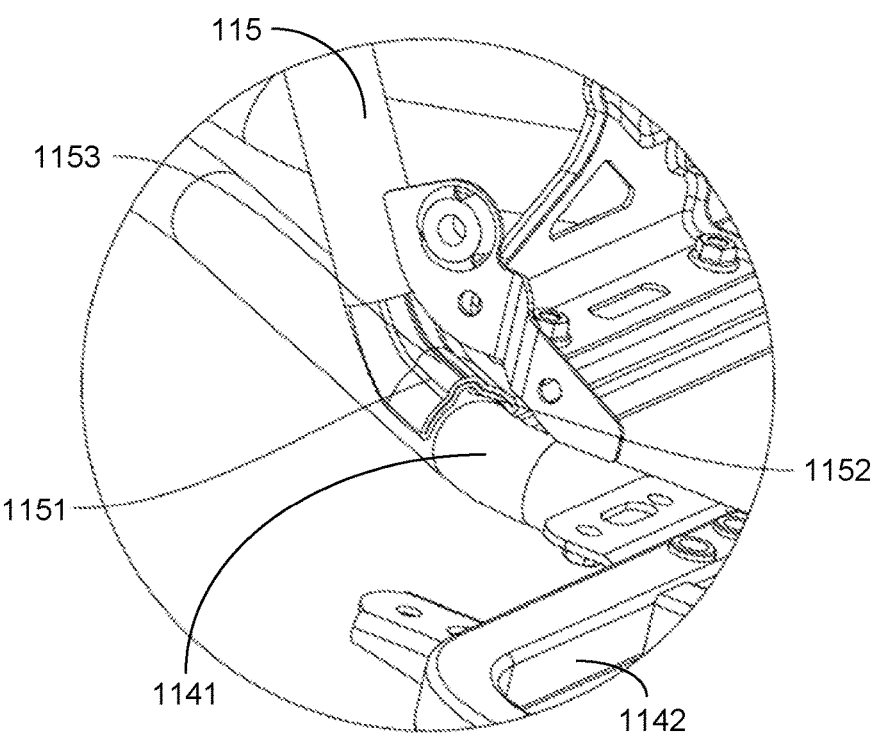
FIG. 7 is an enlarged view of part 7 in FIG. 6.

With prior art designs, electrophoresis defects such as fluid accumulation, paint bumps, and sagging after powder coating or other treatments are prone to occur at the positions where the front section 115 is welded to the bottom beams 1141. FIG. 7 better shows this connection in the preferred embodiment, designed to avoid such electrophoresis defects. As shown in FIG. 7, a bent weld support bracket 1151 is arranged at each of the two intersections between the front section 1113 and the bottom beams 1141. The bent weld support bracket 1151 defines a bend angle and extends in longitudinal contact with the bottom beam 1141. The bent weld support bracket 1151 includes an arc-shaped surface adapted to mate around the external shape of the bottom beam 1141. The wrap length measured circumferentially of the arc-shaped surface is greater than the longitudinal length of the contact between the bent weld support bracket 1151 and the bottom beam 1141. The arc-shaped surface defines a drainage passage 1152 providing a gap running throughout the entire length of the arc-shaped surface. The drainage passage 1152 allows liquid to run longitudinally between the arc-shaped surface and the bottom beam 1141. In lateral cross-section, the drainage passage 1152 may be arc-shaped or square, and the lateral cross-section shape of the drainage passage 1152 is not limited herein. With this design, liquid at the intersection of the front section 115 and the bottom beam 1141 is drained to the outside of the frame body 111 through the drainage passage 1152 during the finishing (powder coating and preparations therefore) treatment of the frame body 111, thereby avoiding electrophoresis defects (such as paint bumps, sagging and liquid accumulation in the frame body 111). In the preferred embodiment, a convex ridge 1153 is exposed on the outer side of the arc-shaped surface, leaving the majority of the arc shape in close contact with the bottom beam 1141 to improve the welding strength of the front section 115 and the bottom beams 1141. The length of the convex ridge 1153 is substantially equal to the length of the drainage passage 1152.

FIGS. 8-15 call out aspects of the preferred suspension system 23. The suspension system 23 includes a front suspension 231, a rear suspension 232, two front shock absorbers 233, and a single rear shock absorber 234. The suspension system 23 transmits force between the wheels 12 and the frame 11, buffering the transmission of impact forces from uneven surfaces over which the vehicle 100 travels to the frame 11, so as to reduce vibration, thereby ensuring that the all-terrain vehicle 100 is able to run smoothly and stably. The rear suspension 232 preferably includes two rear pivot arms 2321 which are right-left mirror images of each other. One end of each rear pivot arm 2321 is supported by one of the rear wheels 121, and the other end of each rear pivot arm 2321 is pivoted to the frame body 111 for pivoting about a generally transverse axis.

Figure 8:
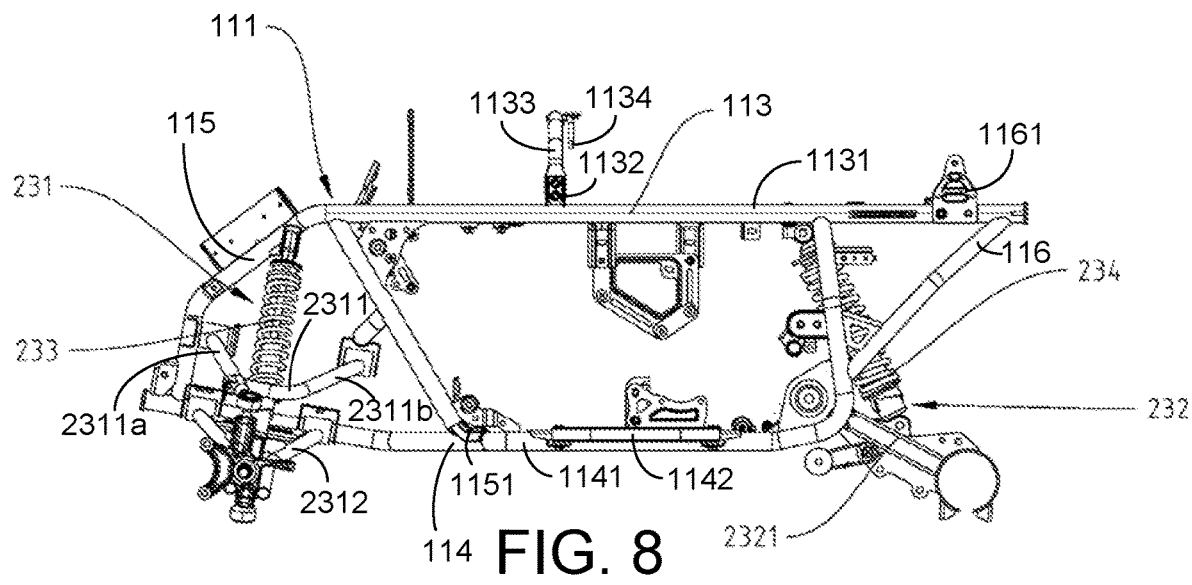
FIG. 8 is a left side view of the frame of FIGS. 4 and 6, not showing the front bracket but additionally showing the front and rear suspensions.
Figure 9:
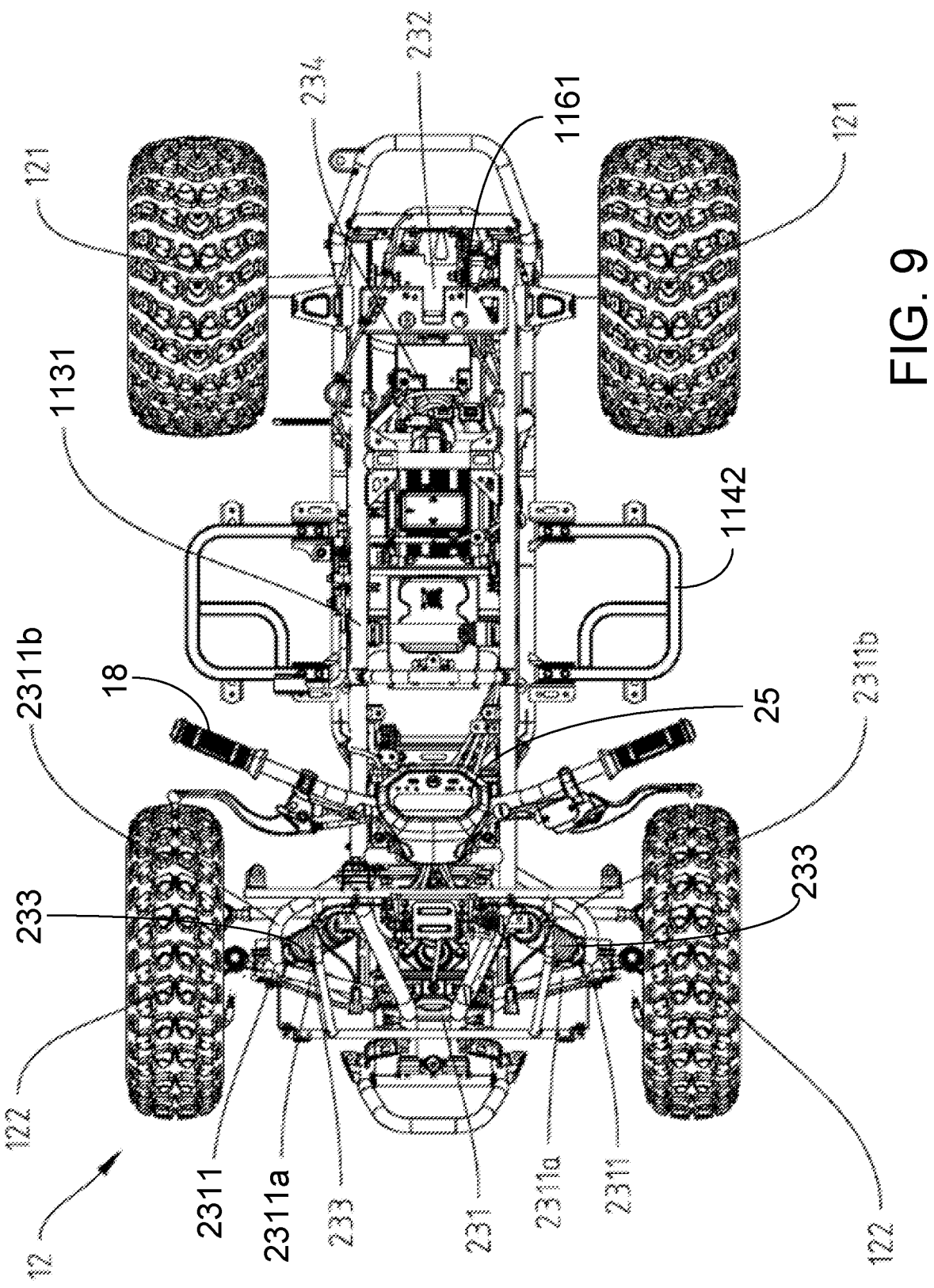
FIG. 9 is a top plan view of the all-terrain vehicle of FIGS. 1-3, similar to FIG. 3 but showing the instrument assembly and with the vehicle cover and saddle assembly omitted.

As called out in FIGS. 8 and 9, the front suspension 231 is preferably a double wishbone type suspension which includes two upper rocker A-arm assemblies 2311 and two lower rocker A-arm assemblies 2312 which are right-left mirror images of each other. The upper rocker A-arm assemblies 2311 and the lower rocker A-arm assemblies 2312 both have their outer end supported by one of the front wheels 122 and both have their inner ends pivotally attached to the frame body 111 for pivoting about generally longitudinal axes. Each upper rocker A-arm assembly 2311 includes a straight arm 2311a and a curved arm 2311b. The outer end of each curved arm 2311b is welded to the outer end of the corresponding straight arm 2311a. The inner ends of the each of the straight arms 2311a and curved arms 2311*b* are pivotally attached to the frame body 111. With two pivot connections (one each) for the two straight arms 2311*a*, two pivot connections (one each) for the two curved arms 2311*b* and four pivot connections (two each) for the right and left lower rocker A-arm assemblies 2312, the front suspension 231 thus has eight pivot connections in total.

Figures 14, 15:
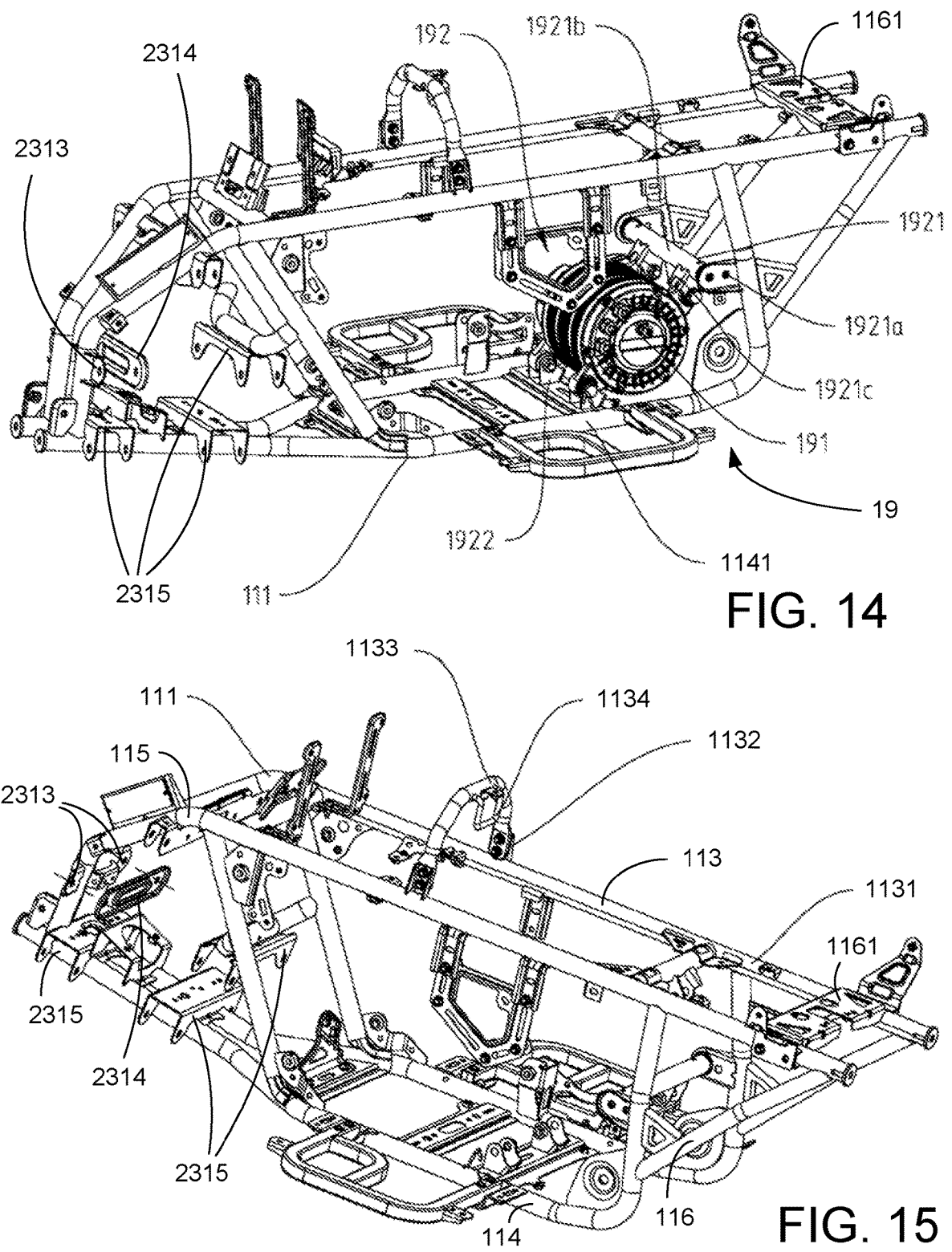
FIG. 14 a front left perspective view of the frame of FIG. 4, not showing the front bracket, but additionally showing the drive motor of the all-terrain vehicle of FIGS. 1-3.
FIG. 15 is the rear left perspective view of FIG. 6, with reference numerals calling out different components.

For at least one set of pivot connections, two rocker arm mounting seats 2313 best shown in FIGS. 6, 14 and 15 are welded to the frame body 111. In the preferred embodiment, the two rocker arm mounting seats 2313 are used for pivot connections of the right and left straight arms 2311*a* of the upper rocker A-arm assemblies 2311. One end (in the preferred embodiment, the front end) of the pivot connection for each straight arm 2311*a* contacts the rocker arm mounting seat 2313. A rocker arm mounting bracket 2314 is arranged at the other (rear) end of these pivot connections for the straight arms 2311*a*, bridging the vehicle centerline to connect the left and right upper rocker A-arm assemblies 2311. The rocker arm mounting bracket 2314 is not welded to the frame body 111. The use of the rocker arm mounting seats 2313 and the rocker arm mounting bracket 2314 effectively simplifies the arrangement of beams for the frame body 111, important due to the smaller layout space of the frame main body 111 for the small size of the all-terrain vehicle 100. If desired, similar rocker arm mounting seats and rocker arm mounting brackets could be used for the pivot connections of the right and left curved arms 2311*b* as well as for the four pivot connections of the lower rocker A-arm assemblies 2312. However, the preferred embodiment uses three rocker arm cross beams 2315 each with a U-shaped mounting seat for these other six pivot connections. The rocker arm mounting seats 2313 and rocker arm mounting bracket 2314 thus allow elimination of at least one rocker arm cross beam with its U-shaped mounting seat from the frame main body 111.

Figure 10:
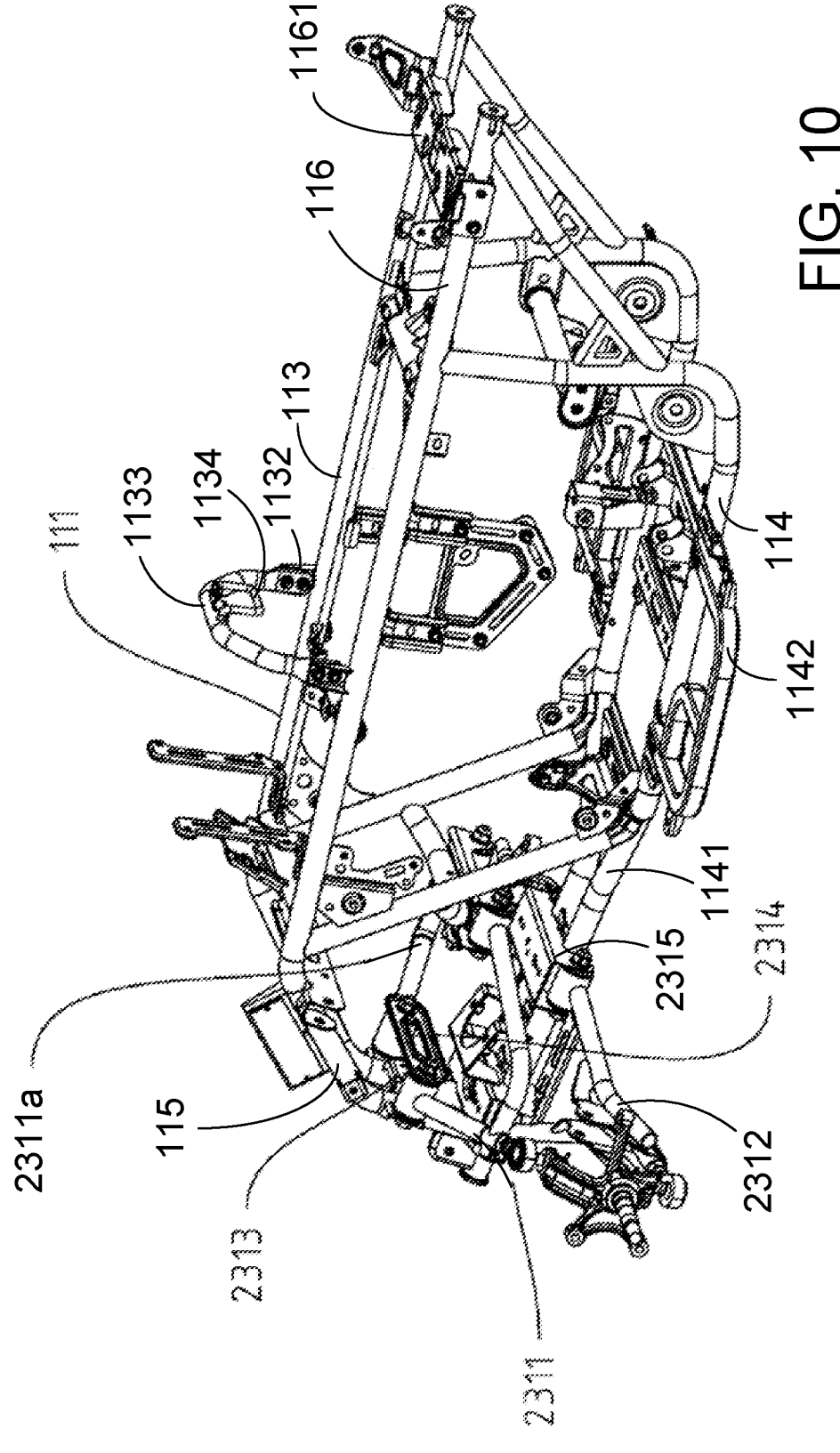
FIG. 10 is rear left perspective view of the frame of the all-terrain vehicle similar to FIG. 6, but adding some components of the front suspension.

As called out in FIGS. 9 and 10, the suspension system 23 includes two front shock absorbers 233 and the single rear shock absorber 234. The top end of each front shock absorber 233 is connected to the front section 115 of the frame body 111, and the bottom end of each front shock absorber 233 is connected as part of the front suspension 231 adjacent one of the front wheels 122. The top end of the rear shock absorber 234 is connected to the rear of the top horizontal section 113 of the frame body 111, and the bottom end of the rear shock absorber 234 is connected as part of the rear suspension 232 centrally between the two rear wheels 121. The three shock absorbers 233, 234 dampen motion of the wheels 12 in the up and down direction perpendicular to the ground reference plane 107.

Figure 11:
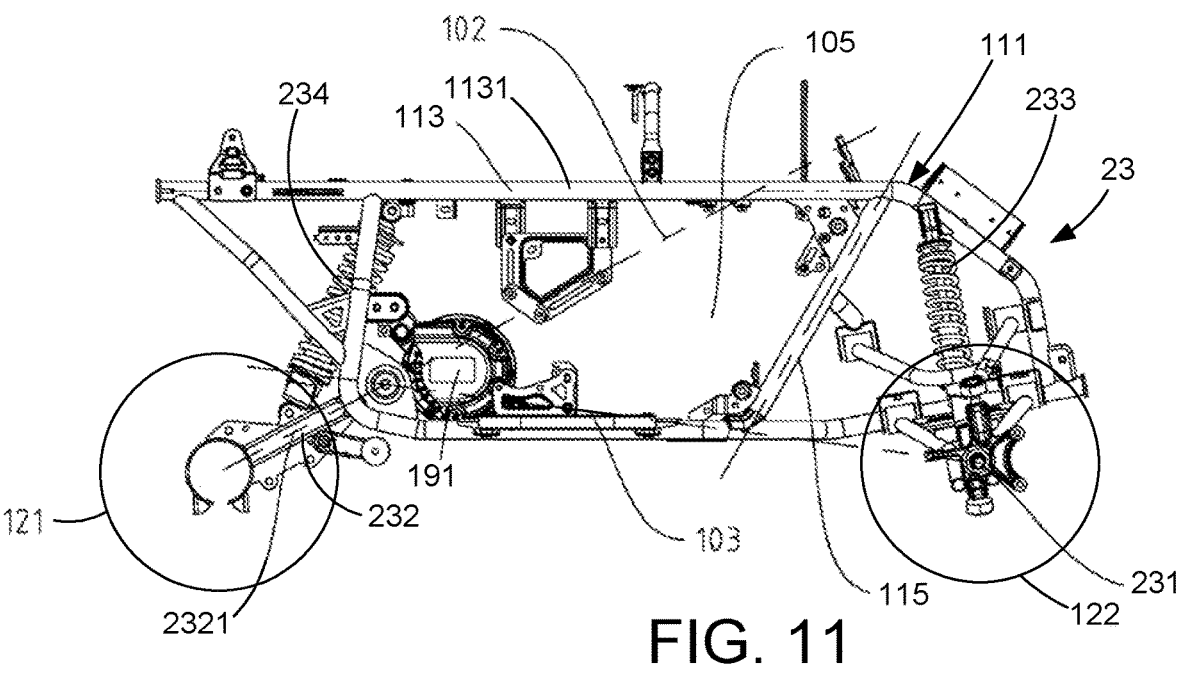
FIG. 11 is a right side view of the frame, motor and suspension system of the all-terrain vehicle of FIGS. 1-3, with positions of the rear wheels and the front wheels shown in a no load state.
Figure 12:
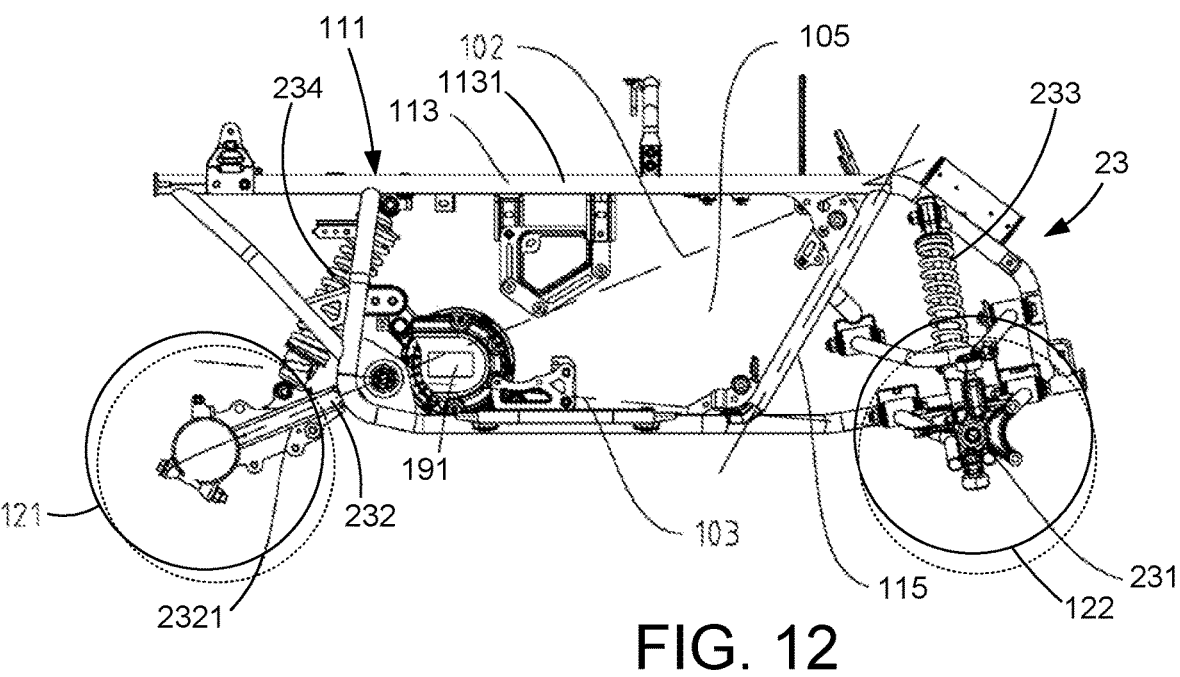
FIG. 12 is a right side view of the frame, motor and suspension system similar to FIG. 11, but with positions of the rear wheels and the front wheels shown in a max loaded state, and also showing the no load state of the wheels in dashed lines.

FIGS. 11 and 12 show the motion of the suspension system 23. The suspension system 23 has a no-load state when the all-terrain vehicle 100 is in empty state (as shown in FIG. 11) and a max-loaded state when the all-terrain vehicle 100 is at the maximum load capacity (as shown in FIG. 12, but depicting the no-load tire position in dashed lines).

Figure 13:
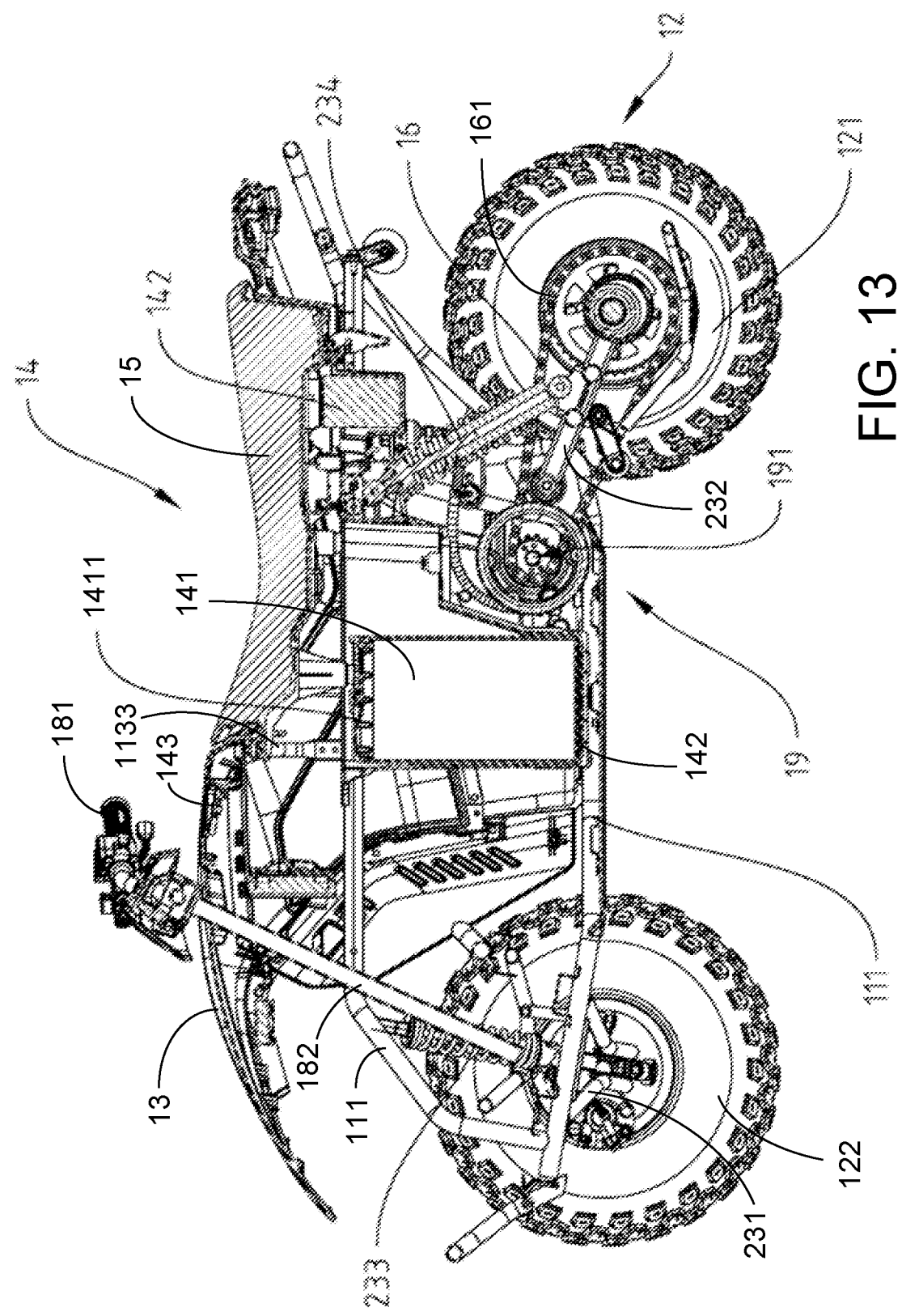
FIG. 13 is the cross-sectional view of FIG. 2, with reference numerals calling out different components.

FIG. 13 shows the preferred power supply system 14, which includes a main power supply assembly 141 and an auxiliary power supply 142. The main power supply system 141 is used to provide electric energy for the drive assembly 19 to drive the all-terrain vehicle 100. The auxiliary power supply 142 supplies power to devices in the all-terrain vehicle 100 which consume low-voltage. The drive system 19 includes a drive motor 191 electrically connected to the main power supply assembly 141. The drive system 19 receives electrical energy output from the main power supply assembly 141 and outputs power to the transmission assembly 16. The transmission assembly 16 receives power output from the drive system 19 and responsively drives the wheels 12 to rotate for locomotion of the all-terrain vehicle 100. The transmission assembly 16 may include a chain or a shaft to transmit torque, with the preferred embodiment using a chain 161 to transmit torque from the drive motor 191 to the rear wheels 121. For easiest use of the chain 161, the drive motor 191 is mounted with its rotational axis oriented transversely on the vehicle 100.

As shown in FIG. 13, the drive motor 191 is mounted on the frame body 111 and is preferably located between the main power supply assembly 141 and the rear wheels 121. In side view as shown in FIGS. 11 and 12, a straight line connecting the axle center of the rear wheels 121 and the pivot axis of the rear pivot arms 2321 is defined as an upper reference line 102, and a straight line connecting the axes of the front wheels 122 (when the front wheels 122 are not being turned) and the pivot axis of the rear pivot arms 2321 is defined as a lower reference line 103. The upper reference straight line 102, the lower reference straight line 103, the top horizontal section 113, and the front section 115 cooperatively define an area 105. The axis of the drive motor 191 is located within the area 105 both in the no-load state and in the max-loaded state. Area 105 is larger in the no-load state than in the max-loaded state.

FIG. 14 shows the location where the drive motor 191 is mounted on the frame body 111. The drive motor 191 is connected to the frame body 111 through a drive motor support cradle 192 which includes an upper drive motor mount rack 1921 and a lower drive motor mount rack 1922. The upper drive motor mount rack 1921 includes two drive motor mounting brackets 1921*a* welded to the frame body 111, and a connection crossbar 1921*b* running between the drive motor mounting brackets 1921*a*. In the preferred embodiment, the two drive motor mounting brackets 1921*a* are plate-type structures, and the connection crossbar 1921*b* is mounted between the drive motor mounting brackets 1921*a* using bolts which extend through the drive motor mounting brackets 1921*a*. Designing the connection crossbar 1921*b* as a detachable structure is convenient to mounting and dismounting the drive motor 191 when the interior space of the child-sized all-terrain vehicle 100 is limited. Two drive motor fixing brackets 1921*c* are arranged on the intermediate connection bracket 1921*b* to complete the connection. The lower drive motor mount rack 1922 is welded between the bottom beams 1141 of the bottom horizontal section 114.

As called out in FIG. 15, a saddle support base 1132 is welded to each top beam 1131 to extend upwardly therefrom. A saddle support beam 1133 is mounted to the top beams 1131 through the saddle support bases 1132. As best seen in FIG. 13, the saddle support beam 1133 is located at the front of the saddle assembly 15. A saddle stopper 1134 is arranged on the saddle support beam 1133. The saddle stopper 1134 may be U-shaped, or the saddle stopper 1134 and the saddle support beam 1133 may collectively form an O-shaped limit device. The U-shaped or O-shaped limit device limits the movement of the saddle assembly 15 forwardly on the saddle support beam 1133. The saddle support beam 1133 and the frame body 111 are designed as two separately structures with the saddle support beam 1133 being detachable from the top beams 1131, which is more conducive to stacking and storage of multiple frame bodies 111 during manufacturing assembly of all-terrain vehicles 100.

Figures 16, 17:
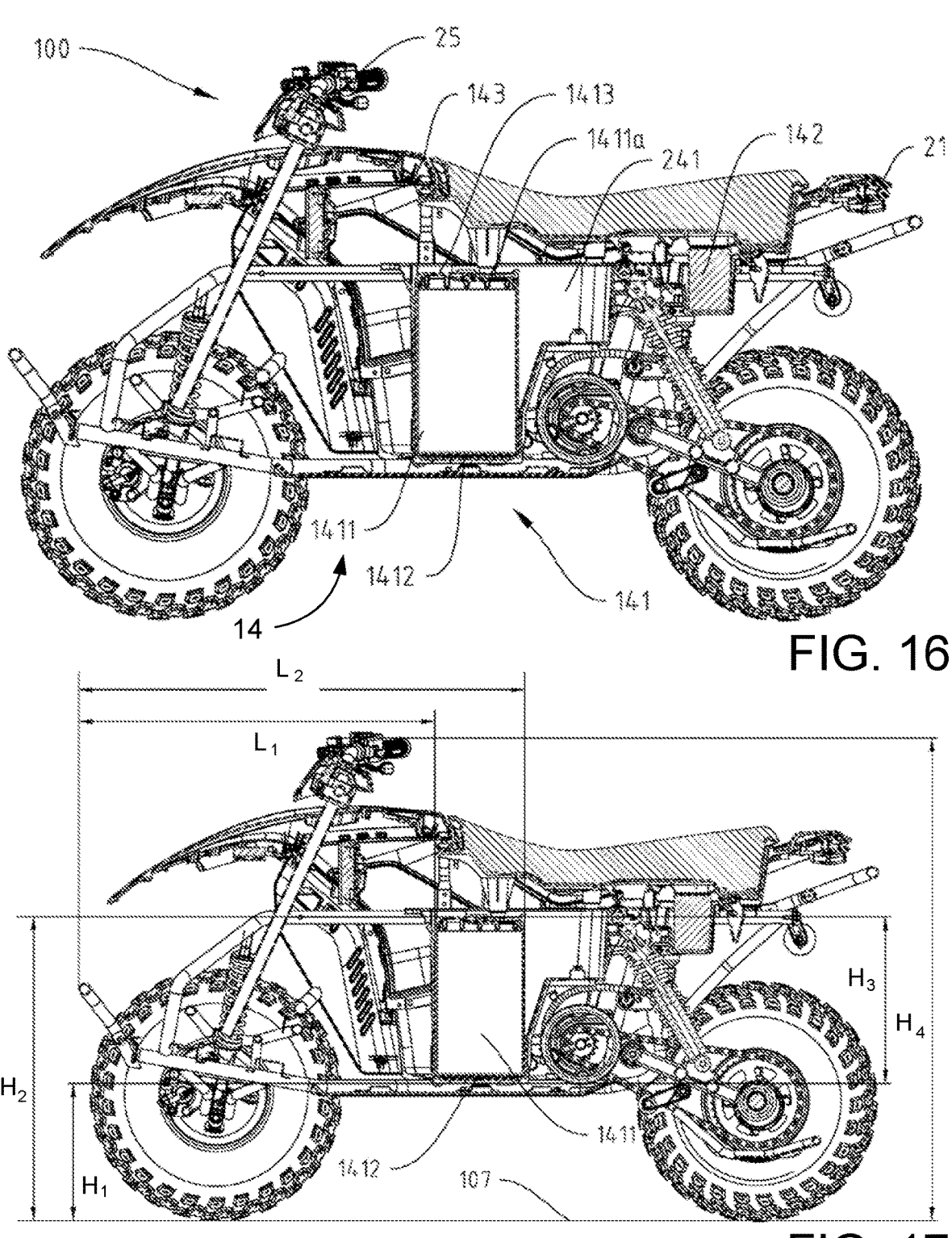
FIG. 16 is the cross-sectional view of FIGS. 2 and 13, with reference numerals calling out different components.
FIG. 17 is the cross-sectional view of FIGS. 2, 13 and 16, with reference numerals calling out certain dimensional relationships.

FIG. 16 calls out elements of the main power supply assembly 141. The main power supply assembly 141 includes a main power supply 1411, a power supply compartment 1412 for accommodating the main power supply 1411, and a charging device 1413 for supplementing the main power supply 1411. As the energy storage and power supply unit of the all-terrain vehicle 100, the main power supply 1411 is used to store and provide the electric energy required for the running of the all-terrain vehicle 100. The power supply compartment 1412 protects the main power supply 1411 from damage. The charging device 1413 is used to electrically charge the main power supply 1411. The auxiliary power supply 142 is used to supply electric power to low-voltage equipment such as the lamps 21, the instrument assembly 25, a horn (not shown), an alarm unit (not shown), a motor control unit 241, and the like. The power supply compartment 1412 is preferably arranged on the frame 11 between parts of the vehicle cover 13 such as a left guard board 1331 (as shown in FIGS. 1 and 3) and a right guard board 1332 (as shown in FIG. 3). The internal size of the power supply compartment 1412 is greater than or equal to the size of the main power supply 1411. One end of the charging device 1413 is connected to a charging interface 1411*a* of the main power supply 1411, and the other end of the charging device 1413 is arranged in a charging port 143 of a front cowl 136 of the vehicle cover 13.

For electrically driven vehicles, the main power supply 1411 is a very important component, which stores and provides all the required electrical energy for the vehicle 100. Moreover, the main power supply 1411 is generally relatively heavy due to the requirement of large endurance, and the main power supply 1411 accounts for a considerable portion of the weight and cost of the electrically powered all-terrain vehicle 100. The type of main power supply 1411 currently most commonly used in electrically driven vehicles is a lithium-ion battery, and lithium-ion batteries generally have safety issues that are difficult to solve. Therefore, necessary protective measures need to be taken for the main power supply 1411. The power supply compartment 1412 is designed for accommodating the main power supply 1411 and limiting its movement, so as to ensure that the main power supply 1411 will not move in the frame 11 during running, which can avoid the problem of instability of the center of gravity of the all-terrain vehicle 100 caused by the weight distribution of the main power supply 1411 as well as the potential safety hazard caused by damage of the main power supply 1411. The power compartment 1412 allows direct fixing of the main power supply 1411 on the frame 11 to be avoided, which is more convenient for disassembly of and replacement of the main power supply 1411 and off-board charging of the main power supply 1411. The power supply compartment 1412 can also protect the main power supply 1411 from collision, thereby avoiding potential safety hazards. Moreover, the power supply compartment 1412 isolates the main power supply 1411 from other equipment of the all-terrain vehicle 100, which can reduce the possibility of damage to other equipment of the all-terrain vehicle 100 if the main power supply 1411 does become damaged. The power compartment 1412 also serves to isolate the main power supply 1411 from the driver and protect the driver from the main power supply 1411, increasing driver safety in the event of extreme damage to the main power supply 1411. The power supply system 14 includes a charging device 1413 connected to the charging interface 1411*a* of the main power supply 1411, which can realize the on-board charging of the main power supply 1411 without dismantling the main power supply assembly 141, reduce the installation and disassembly frequency of the main power supply 1411, and improve the user convenience of the all-terrain vehicle 100.

FIGS. 17-20, 24-26, 28 and 29 call out various dimensional relationships of different components of the preferred all terrain vehicle 100. The power supply compartment 1412 is located in the middle of the bottom of frame 11. In the electrically driven all-terrain vehicle 100, the main power supply 1411 accounts for a high proportion of the weight of all-terrain vehicle 100, and the position of the main power supply 1411 has a greater impact on the center of gravity of all-terrain vehicle 100. The main power supply 1411 is placed within the power supply compartment 1412, and the position of the power supply compartment 1412 also determines the installation position of the main power supply 1411 in the all-terrain vehicle 100. The height of the power supply compartment 1412 is limited, so that the center of gravity of the all-terrain vehicle 100 is at a lower position, thereby ensuring that the all-terrain vehicle 100 is not prone to rollover during running. As shown in FIG. 17, a vertical distance from the bottom of the power supply compartment 1412 to the ground reference plane 107 is defined as H1, and H1 is preferably in the range from 200 mm to 300 mm, more preferably in the range from 230 mm to 285 mm, and most preferably in the range from 245 mm to 275 mm A vertical distance from the top of the power supply compartment 1412 to the ground reference plane 107 is defined as H2, and H2 is preferably in the range from 500 mm to 750 mm, more preferably in the range from 560 mm to 690 mm, and most preferably in the range from 590 mm to 660 mm. The height of the power supply compartment 1421 is defined as H3 and the height of the all-terrain vehicle 100 is defined as H4. The ratio of H3 to H4 is preferably in the range from 0.3 to 0.45, and more preferably in the range from 0.35 to 0.43, and most preferably in the range from 0.37 to 0.41.

In addition to the main power supply 1411, the drive motor 191 also accounts for a relatively high proportion of the weight of the all-terrain vehicle 100. In order to shorten the drive train of the preferred rear wheel drive of the all-terrain vehicle 100, the drive motor 191 is mostly located toward the rear of the all-terrain vehicle 100. Therefore, in order to balance the weight of the all-terrain vehicle 100, the main power supply 1411 and the power supply compartment 1412 need to be set slightly closer to the front of the all-terrain vehicle 100 than the front-back midpoint of the vehicle 100, so that the overall center of gravity of all-terrain vehicle 100 can be located near the front-back center of all-terrain vehicle 100. A distance along the forward direction 101 from the front edge of the power supply compartment 1412 to the front edge of the all-terrain vehicle 100 is defined as L1, and L1 is preferably in the range from 485 mm to 735 mm, more preferably in the range from 550 mm to 670 mm, and most preferably in the range from 580 mm to 640 mm A distance along the forward direction 101 from the rear edge of the power supply compartment 1412 to the rear edge of all-terrain vehicle 100 is defined as L2, and L2 is preferably in the range from 810 mm to 1220 mm, more preferably in the range from 920 mm to 1120 mm, and most preferably in the range from 970 mm to 1070 mm.

Figure 18:
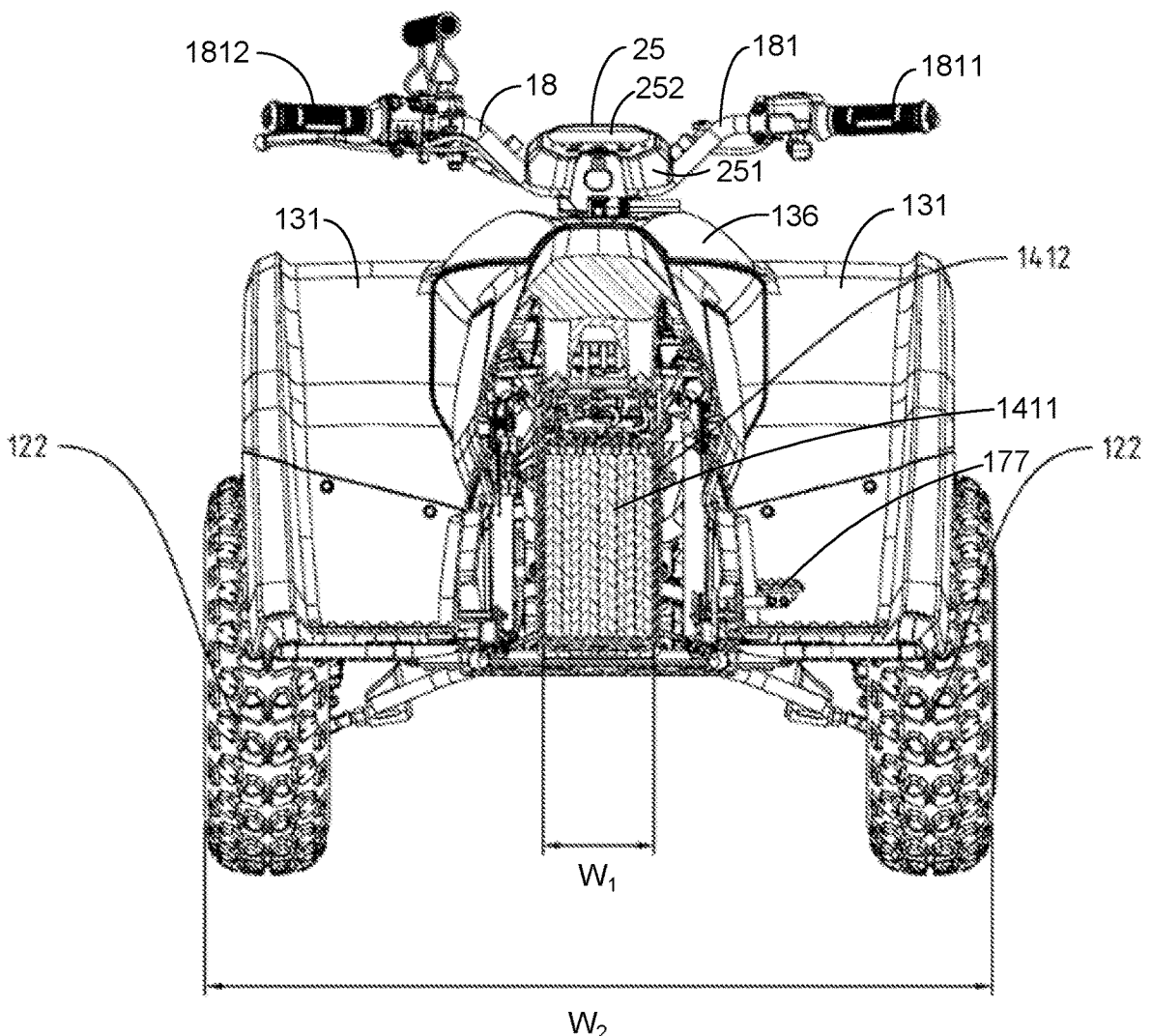
FIG. 18 is a cross-sectional view of the all-terrain vehicle of FIGS. 1-3, taken looking forward at a laterally extending midplane of the vehicle.

The position of the power supply compartment 1412 is limited in the side-to-side direction, so that the center of gravity of the all-terrain vehicle 100 can be located at the right-to-left center of the all-terrain vehicle 100, increasing the stability of the all-terrain vehicle 100 during driving and helping to avoid rollover. A wide wheelbase also increases the stability of the all-terrain vehicle 100 during driving and helps to avoid rollover. The power supply compartment 1412 is preferably as wide as possible to reduce height and lower its center of gravity, but also needs to be narrow enough for straddling. As shown in FIG. 18, the width of the power supply compartment 1412 is defined as power supply width W1, and a distance between the outer edges of the two front wheels is defined as front wheel width W2. The ratio of power supply width W1 to front wheel width W2 is preferably in the range from 0.21 to 0.33, more preferably in the range from 0.24 to 0.30, and most preferably in the range from 0.25 to 0.29.

In the preferred vehicle 100, disassembly and removal of the saddle assembly 15 is easier than disassembly and removal of the front fenders 131, the rear fenders 132, the front cowl 136, the left guard board 1331 or the right guard board 1332 on the all-terrain vehicle 100. For components such as the main power supply 1411 that require frequent disassembly and removal, arranging the main power supply 1411 below the saddle assembly 15 can facilitate disassembly and removal of the main power supply 1411. That is to say, when the main power supply 1411 needs to be removed, simple removal of the saddle assembly 15 should permit easy access to and/or removal of the main power supply 1411. After the main power supply 1411 is removed, operations including replacing the main power supply 1411 or performing off-board charging on the removed main power supply 1411 can be carried out. The layout of the vehicle should allow such easy access and removal. The preferred vehicle 100 has both the power supply compartment 1412 and the drive motor 191 located in the frame 11 below the saddle assembly 15. A projection of the main power supply 1411 projected on the ground reference plane 107 is defined as a power supply projection, a projection of the drive motor 1411 projected on the ground reference plane 107 is defined as a drive motor projection and a projection of the saddle assembly 1411 projected on the ground reference plane 107 is defined as a saddle projection. To facilitate such easy access and removal, the power supply projection preferably has a smaller area than the saddle projection, and the drive motor projection preferably has a smaller area than the saddle projection. In the preferred embodiment, both the power supply projection and the drive motor projection re located within or nearly within the saddle projection. To achieve that, a front-most endpoint of the saddle projection is generally located at the front edge of the power supply projection.

Figures 19, 20:
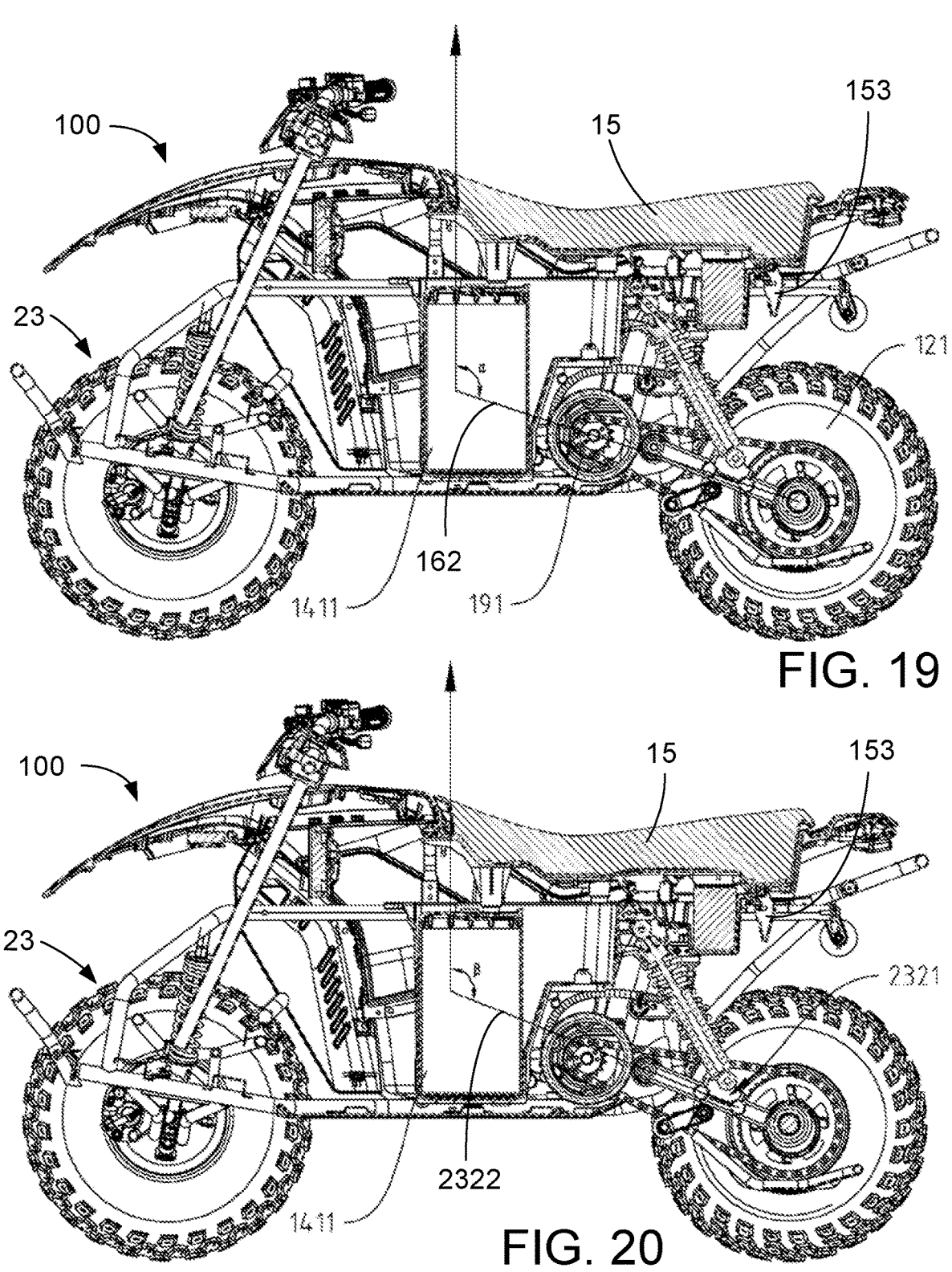
FIG. 19 is the cross-sectional view of FIGS. 2, 13, 16 and 17, calling out the angle of the drive system.
FIG. 20 is the cross-sectional view of FIGS. 2, 13, 16, 17 and 19, calling out the angle of the rear rocker arm.

FIGS. 19 and 20 show two angles of the preferred vehicle layout. In electrically driven vehicles, the weight of the main power supply 1411 accounts for a large portion of the weight of the all-terrain vehicle 100. The position of the main power supply 1411 seriously affects the weight distribution and center of gravity position of the all-terrain vehicle 100. The drive motor 191 also accounts for a considerable portion of the weight of the all-terrain vehicle 100. The position relationship between the main power supply 1411 and the drive motor 191 has a great impact on positioning the center of gravity of the all-terrain vehicle 100 in an appropriate position. In side view with the suspension system 23 at a fully loaded position, a fully loaded rear drive projection line 162 is defined to run between a drive motor output shaft axis and a rear wheel axis. A fully loaded rear drive angle α (as shown in FIG. 19) between the fully loaded rear drive projection line 162 and vertical is preferably in the range from 90° to 120°, more preferably in the range from 95° to 115°, and most preferably in the range from 100° to 110°. If the fully loaded rear drive angle α is too small (such as less than 90° where the drive motor output shaft axis under full suspension load is lower than the rear wheel axis), although the center of gravity of the all-terrain vehicle 100 can be reduced, the position of the drive motor 191 will be lower, which can reduce the ground clearance of the all-terrain vehicle 100. Though ground clearance could be raised by using larger wheels 12, wheel size has a significant impact on the performance of the all-terrain vehicle 100. On the other hand, if the fully loaded rear drive angle α is too large, the center of gravity of the all-terrain vehicle 100 will be higher, which affects its stability during running. In side view with the suspension system 23 at a fully loaded position, a rear pivot arm projection line 2322 (which may coincide with the upper reference line 102 discussed in regard to FIGS. 11 and 12) is defined to run along the rear pivot arm 2321. A fully loaded pivot arm angle β (as shown in FIG. 20) between the rear pivot arm projection line 2322 and vertical is preferably in the range from 90° to 135°, more preferably in the range from 100° to 125°, and most preferably in the range from 110° to 115°.

FIGS. 21-24 better show how the preferred saddle assembly 15 is made to be removable. The saddle assembly 15 has a saddle locked state and a saddle unlocked state. The saddle assembly 15 is locked onto frame 11 and cannot move relative to frame 11 when the saddle assembly 15 is in the saddle locked state. The saddle assembly 15 will not separate from the frame 11, especially during running, thereby ensuring the safety of the driver. When the lock between the saddle assembly 15 and the frame 11 is released and the saddle assembly 15 can move relative to frame 11, the saddle assembly is in the saddle unlocked state. When in the saddle unlocked state, the saddle assembly 15 can be easily lifted and removed from frame 11. After removing the saddle assembly 15, the main power supply 1411, drive motor 191, and any other components below saddle assembly 15 are exposed from above. Users can take out the main power supply 1411 from the power supply compartment 1412 as needed, replace or repair other components located under the saddle assembly 15, or remove articles placed in any storage space (not shown) which is located under the saddle assembly 15. After the main power supply 1411 is removed from the power supply compartment 1412, further processing can be carried out on the main power supply 1411, such as replacing the main power supply 1411 or conducting off-board charging on the main power supply 1411.

Figures 21, 22:
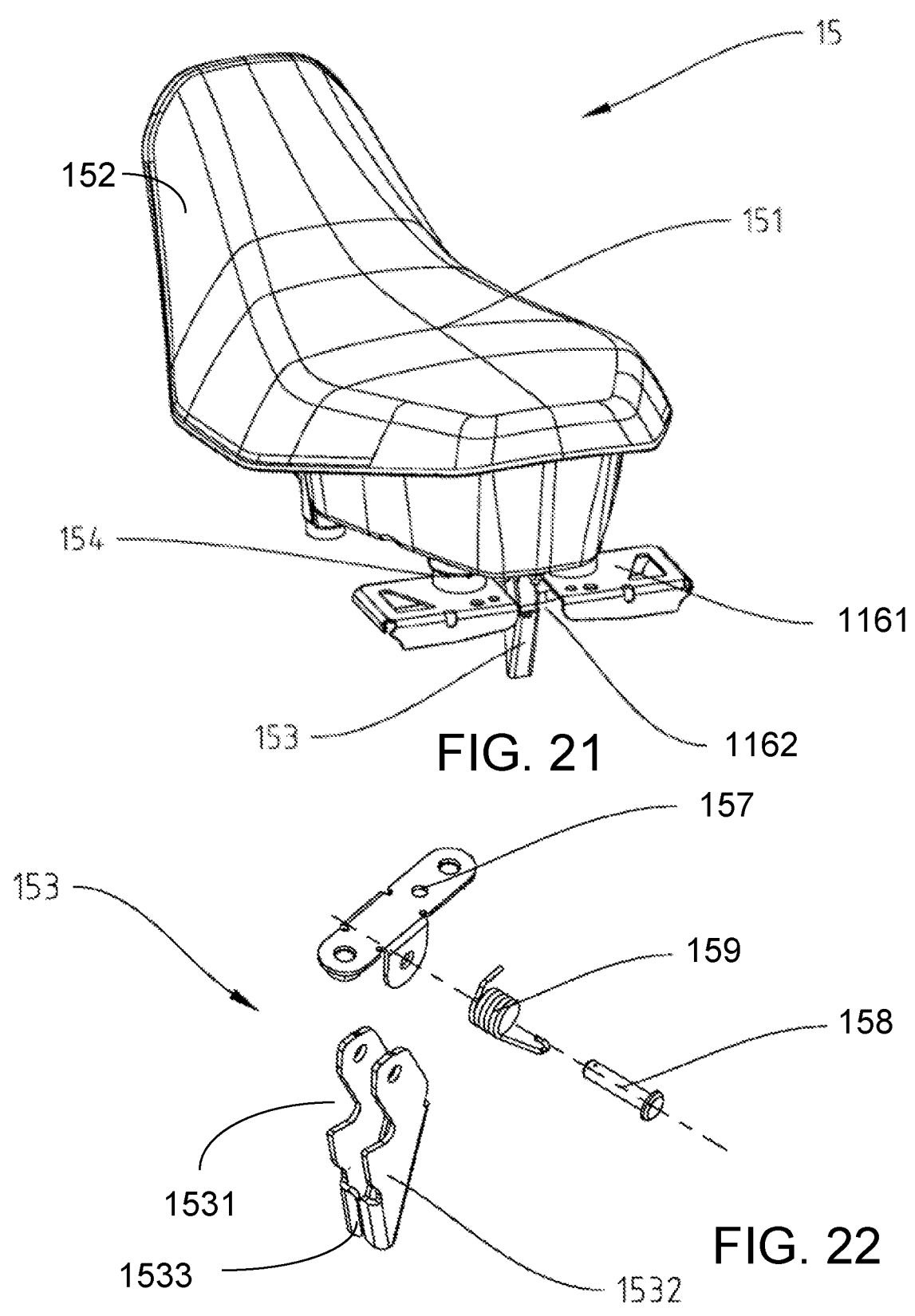
FIG. 21 is a rear left perspective view of the saddle assembly and the rear crossplate of the frame of the all-terrain vehicle of FIGS. 1-3.
FIG. 22 is an exploded perspective view of a saddle locking hook of FIG. 21.

The saddle assembly 15 includes a saddle 151 and a saddle locking hook 153 located at the bottom of the saddle 151. When saddle assembly 15 is in the saddle locked state, the saddle locking hook 153 secures the saddle assembly 15 to the frame 11. As shown in FIG. 21, the locked state of the saddle assembly 15 positions the saddle locking hook 153 so it extends through a lock opening 1162 on the rear crossplate 1161 of the frame 11. This location for the saddle locking hook 153 saves space below the saddle 151, leaving more space below the saddle assembly 15 for arranging other components.

Figure 23:
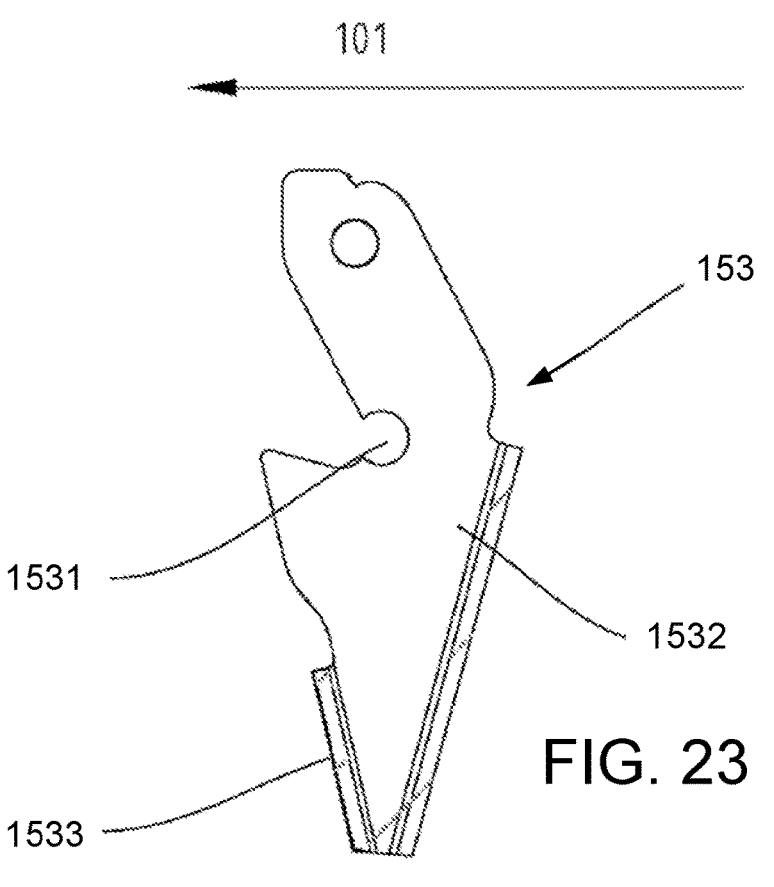
FIG. 23 is cross-sectional view taken of the saddle locking hook and rear crossplate taken at the longitudinal center plane of the hook body of the saddle assembly of FIG. 21.

As better shown in FIGS. 22 and 23, the saddle locking hook 153 includes a latch opening 1531 above a hook arm 1532. The saddle locking hook 153 is pivotally secured relative to the saddle 151 by a hook mounting base 157 fixed at the bottom of the saddle 151, with the hook mounting base 157 holding a pivot pin 158 which extends through saddle locking hook 153. A hook torsion spring 159 biases the saddle locking hook 153 pivoted forwardly about the pivot pin 158 toward a locked position. In the locked state, the hook arm 1532 extends beneath the rear crossplate 1161, with the lock opening 1162 of the rear crossplate 1161 mating into the latch opening 1531. The action of the hook torsion spring 159 allows the saddle assembly 15 to be secured just by lowering and snapping the saddle assembly 15 into place, thereby fixing the saddle assembly 15 to the frame 11.

The saddle locking hook 153 includes a handle finger plate 1533 for the driver to toggle and unlock the saddle locking hook 153 by pulling rearwardly on the handle finger plate 1533. The orientation of the latch opening 1531 is in the forward direction 101. The handle finger plate 1533 is below the latch opening 1531. The rear fenders 132 and the rear section 116 of the frame 11 allow users to reach under and grasp the handle finger plate 1533 for manually pulling rearwardly. This outward pulling operation to unlock the saddle assembly 15 is in line with the operating habits of the vast majority of people, which increase convenience and makes it easier to implement unlocking operations. Having adequate clearance and access to the handle finger plate 1533 is particularly important on a child-sized all-terrain vehicle 100, when the vehicle 100 is small but maintenance under the saddle assembly 15 is still usually performed by adult hands. The preferred configuration of the saddle assembly 15 solves problems of difficult access and unlocking, and simultaneously occupies less space without requiring complicated or expensive locking structures.

Figure 24:
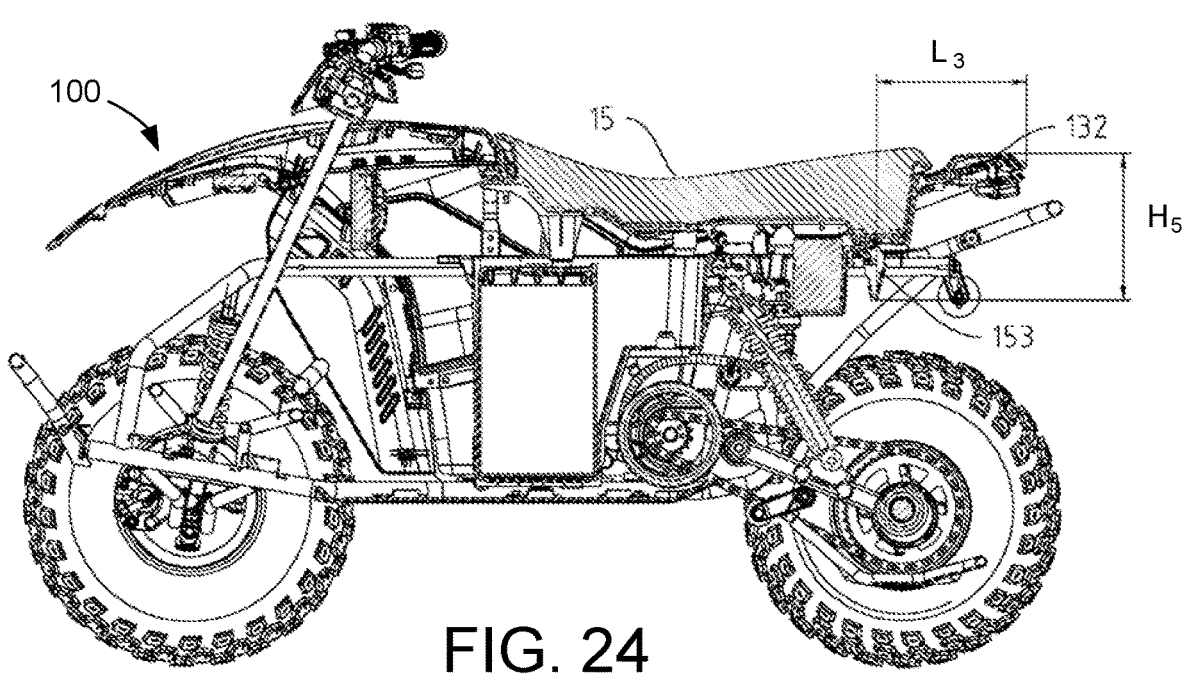
FIG. 24 is the cross-sectional view of FIGS. 2, 13, 16, 17, 19 and 20, calling out the position of the saddle locking hook.

FIG. 24 shows dimensions associated with the preferred location of the saddle locking hook 153. The vertical distance from the bottom of saddle locking hook 153 to the top of the rear fenders 132 is defined as H5, and the H5 is preferably in the range from 80 mm to 320 mm, more preferably in the range from 100 mm to 300 mm, and most preferably in the range from 150 mm to 250 mm. The horizontal distance from the handle finger plate 1533 of the saddle locking hook 153 and the tail edge of the rear fenders 132 is defined as L3, and the L3 is preferably in the range from 0 mm to 500 mm, most preferably in the range from 50 mm to 450 mm, and most preferably in the range from 100 mm to 400 mm. This preferred positioning of the saddle locking hook 153 makes it difficult for the driver to inadvertently contact the saddle locking hook 153 while driving the vehicle 100 thereby improving safety, but allows easy access when the driver is off the vehicle 100. This preferred positioning of the saddle locking hook 153 also protects the saddle locking hook 153 by the rear fenders 132, so the saddle locking hook 153 is not prone to collision damage.

The preferred saddle assembly 15 includes a plurality of saddle buffers 154 (as shown in FIG. 21) arranged between the saddle 151 and the rear section 116 of the frame 11. The saddle buffers 154 are located at the bottom of the saddle 151 and on both sides of the saddle locking hook 153. The saddle buffers 154 may be formed of rubber or other soft, compressible and resilient polymer materials, or alternatively may be metal springs. The saddle buffer 154 at least partially compresses when the saddle assembly 15 is in the saddle locked state. The saddle assembly 15 is unlocked frequently, and has a certain weight. The saddle buffers 154 help to avoid damage to either the saddle assembly 15 or the frame 11 when the saddle assembly 15 is dropped into the locked state during saddle installation. This increases the service life of the saddle assembly 15 and the vehicle 100 as a whole. At the same time, the saddle buffers 154 move the saddle assembly 15 upwardly after the saddle locking hook 153 is unlocked, forming a gap between the rear of the saddle assembly 15 and the rest of the vehicle 100 that can be reached by hand, and creating a space for lifting the saddle assembly 15 by hand after the saddle assembly 15 is unlocked. At the same time, each buffer 154 is consumable (i.e., has a shorter life than the vehicle 100, which can be viewed as a wear item) and the saddle assembly 15 is detachable. The saddle buffers 154 are preferably part of the saddle assembly 15 and thus are detached from the vehicle 100 together with the saddle assembly 15, facilitating timely replacement of the saddle buffers 154, particularly beneficial should the rubber or polymer material of the saddle buffers 154 degrade over time.

Figure 25:
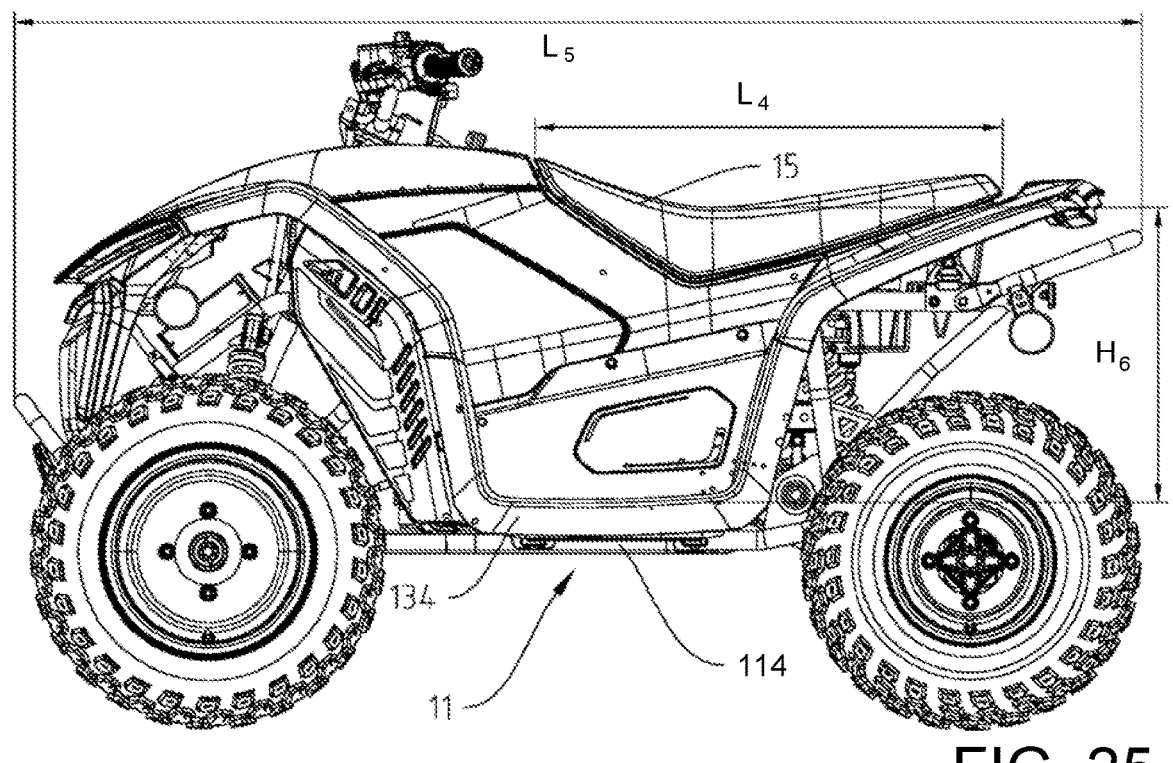
FIG. 25 is the side view of FIG. 1, calling out parameters of the saddle position.
Figure 26:
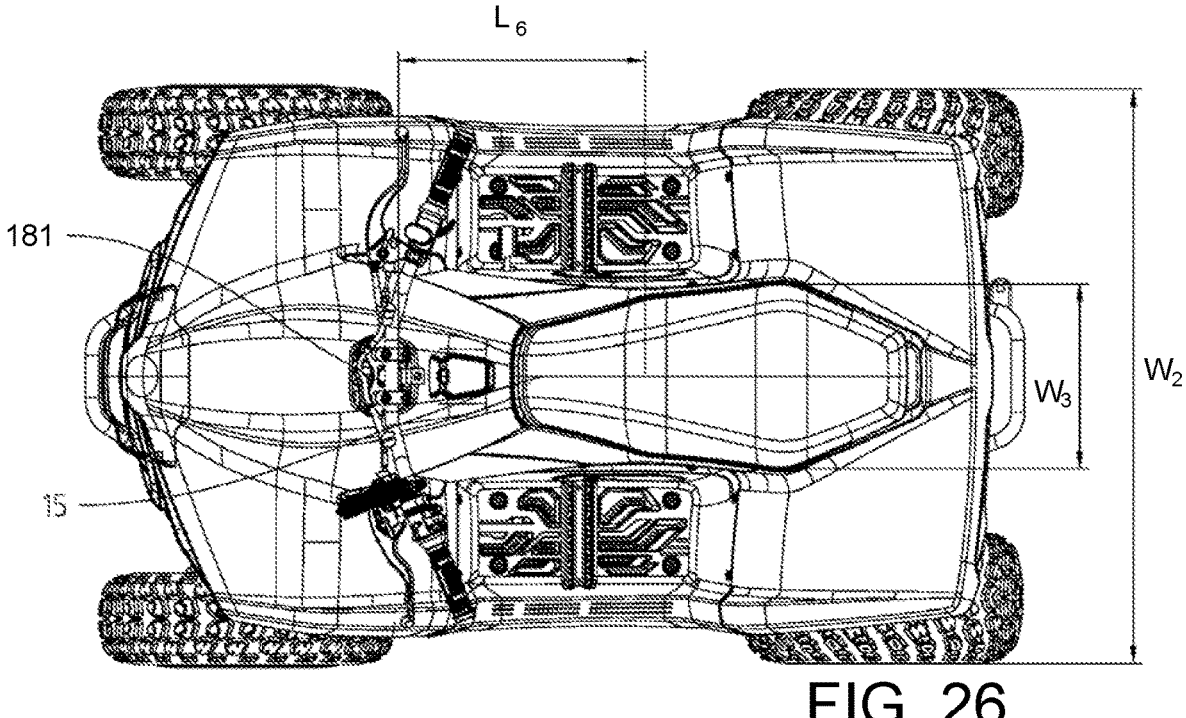
FIG. 26 is the top plan view of FIG. 3, calling out parameters of the saddle position.

FIGS. 25 and 26 show preferred positioning and size of the saddle assembly 15 for a child-sized all-terrain vehicle 100. The vehicle 100 includes a location intended for the driver's feet while riding. For instance, the preferred frame 11 includes two foot plate brackets 1142 (called out in FIGS. 4, 6 and 8-10) which extend horizontally from each of the bottom beams 1141, and foot plates 134 are mounted on the foot plate brackets 1142 so as to provide a horizontal top surface for the driver's feet. A saddle point exists on the surface of the saddle assembly 15, generally defined as the lowest point on the surface of the saddle 151 along its longitudinal midplane. The vertical distance from the saddle point to the foot plate 134 is defined as straddle height H6. The straddle height H6 is preferably in the range from 300 mm to 500 mm, more preferably in the range from 350 mm to 450 mm, and most preferably in the range from 380 mm to 420 mm. If the straddle height H6 is too long, drivers will sit on the saddle assembly 15 with both feet suspended, which makes operation of the vehicle 100 difficult, causing safety issues. Conversely, riding fatigue is increased if the straddle height H6 is too short. The length of the saddle assembly 15 is defined as saddle length L4. Saddle length L4 is preferably in the range from 480 mm to 720 mm, more preferably in the range from 540 mm to 660 mm, and most preferably in the range from 570 mm to 630 mm. The total length of the all-terrain vehicle 100 is defined as vehicle length L5. The ratio of the saddle length L4 to vehicle length L5 is in the range from 0.30 to 0.48, more preferably in the range from 0.35 to 0.44, and most preferably in the range from 0.37 to 0.42. The minimum horizontal distance from the saddle point to the handlebar 181 along the forward direction 101 is defined as L6, and L6 is preferably in the range from 370 mm to 550 mm, more preferably in the range from 400 mm to 520 mm, and most preferably in the range from 435 mm to 485 mm. In the all-terrain vehicle 100, the relative position relationship between the saddle 151, the foot plate 134 and the handlebar 181 directly affects the driver's riding posture and has a significant impact on riding comfort. The body of the driver may need to lean too far forward when the distance from the saddle point to the handlebar 181 is too long. Sports bikes or racing bikes often adopt this riding posture to reduce wind resistance and achieve higher speed and acceleration ability, but sacrifice driver comfort to do so. The body of the driver may need to be in a curled up state and not stretched enough when the distance from the saddle point to the handlebar 181 is too short, which increases riding fatigue.

As shown in FIG. 26, the width of the saddle assembly 15 is defined as saddle width W3. The saddle width W3 is preferably in the range from 150 mm to 350 mm, more preferably in the range from 200 mm to 300 mm, and most preferably in the range from 220 mm to 280 mm. The total width of the all-terrain vehicle 100 is defined as vehicle width W4, which may or may not be the same as the front wheel width W2. The ratio of the saddle width W3 to the vehicle width W4 is preferably in the range from 0.16 to 0.38, more preferably in the range from 0.21 to 0.32, and most preferably in the range from 0.23 to 0.30. When the saddle width W3 is too narrow, the contact area between the saddle 151 and the driver's buttocks is smaller, causing greater pressure on the driver's body, causing discomfort during driving, exacerbating fatigue, and even causing damage to the driver's body. If the saddle width W3 is too wide, the distance between driver's feet is too far which exacerbates discomfort and causes safety issues. In sum, when the straddle height H6, the saddle width W3, and the distance L6 are limited in the above ranges, the driver can adopt a more comfortable riding posture, which can improve riding enjoyment and riding safety.

Figure 27:
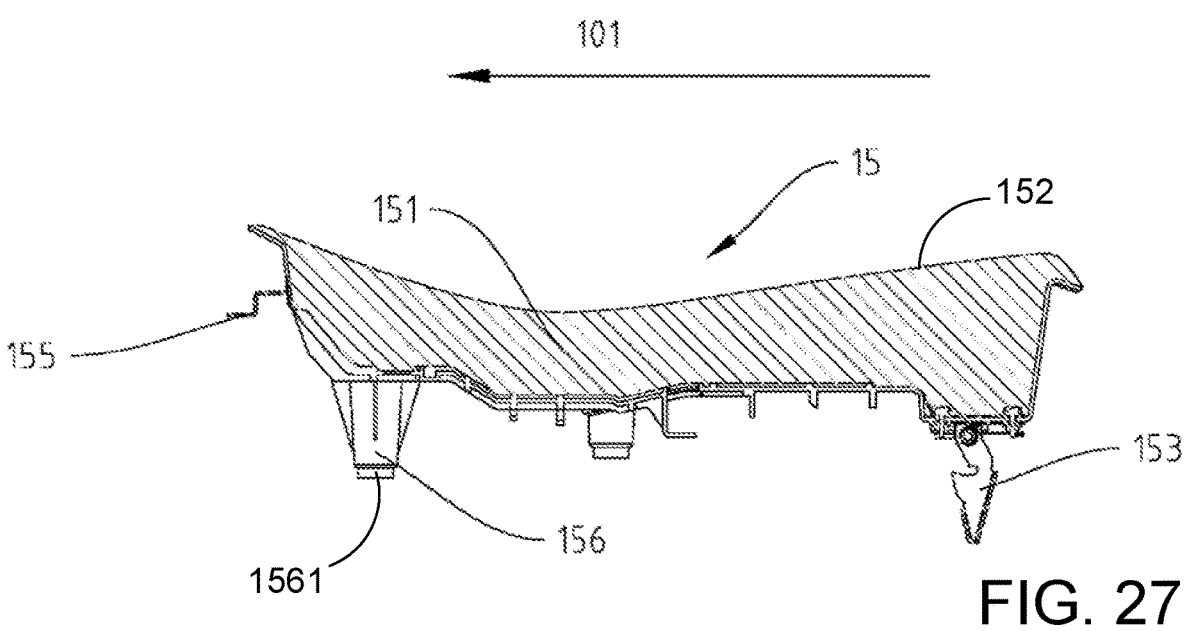
FIG. 27 is a cross-sectional side view taken along the longitudinally extending center plane of the saddle assembly of FIG. 21.
Figure 30:
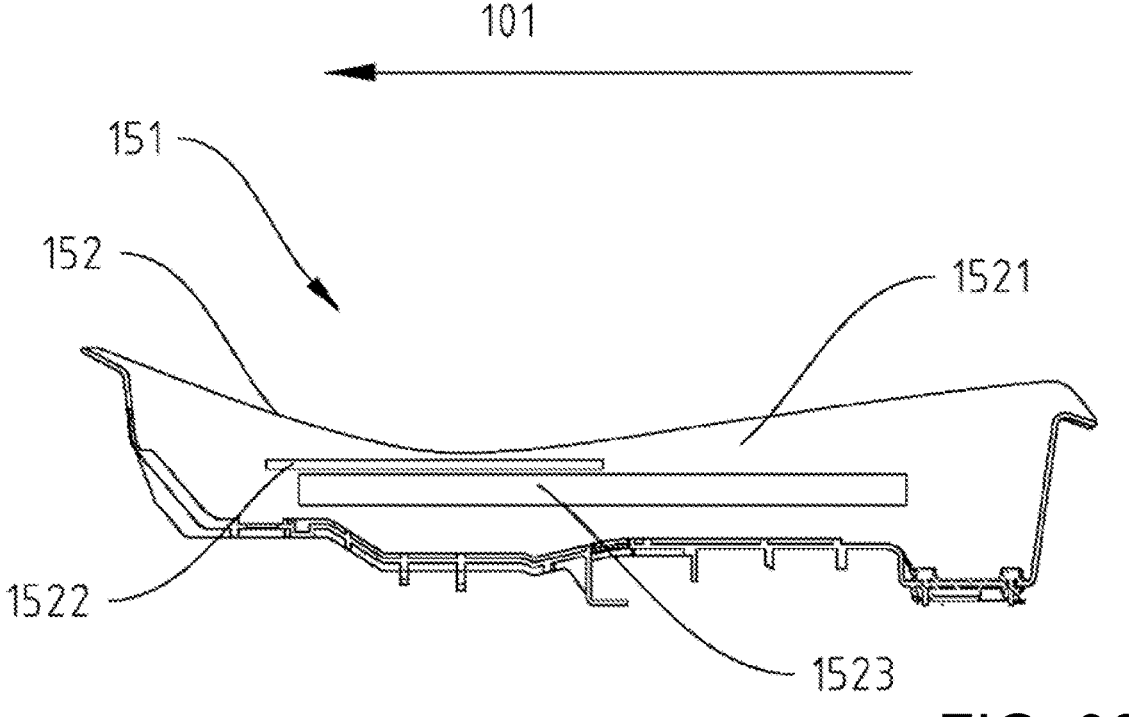
FIG. 30 is a side view of the preferred saddle assembly, schematically showing a pressure sensor and a heating component.

FIG. 27 focuses on the preferred saddle assembly 15. The saddle assembly 15 includes a saddle fixing flange 155 located at the front of the saddle 151. When the saddle assembly 15 is in the saddle locked state, the saddle fixing flange 155 engages with the saddle support beam 1133 and the saddle stopper 1134 called out in FIG. 15 to hold the front of the saddle assembly 15 down in place, while the back of the saddle assembly 15 is held down in place by the saddle locking hook 153.

The preferred saddle assembly 15 also includes one or more power supply stoppers 156, which extends downwardly on the saddle assembly 15 beneath the saddle 151 and at a middle position between the saddle fixing flange 155 and the saddle locking hook 153. In the preferred embodiment, the power supply stopper(s) 156 each include a stopper buffer 1561 at their lower end, with the stopper buffer(s) 1561 formed so as to be compressible and resilient, such as being formed of rubber. When the saddle assembly is locked to the frame 11, the power supply stopper 156 contacts the main power supply 1411 to hold the main power supply down within the power supply compartment 1412. When the saddle assembly 15 is detached from the frame 11, the main power supply 1411 is only held in the power supply compartment 1412 by its own weight. The saddle assembly 15 has a stable structure, and holding the main power supply 1411 in place through the saddle assembly 15 can reduce or eliminate the use of additional structure for fixing the main power supply 1411. The power supply stopper 156 effectively utilizes the structure and weight of the saddle assembly 15 to fix the main power supply 1411 in place, reducing the cost of the all-terrain vehicle 100. When removing or replacing the main power supply 1411, the user simply removes the saddle assembly 15 without unlocking a separate fixing structure of the main power supply 1411 and hand pulls the main power supply 1411 upward out of the power supply compartment 1412, making removal or replacement of the main power supply 1411 simple, easy and convenient. If desired, the main power supply 1411 may include a pivoting handle (not shown) on its top to facilitate hand pulling of the main power supply 1411 upwardly and carrying of the main power supply 1411.

Figures 28, 29:
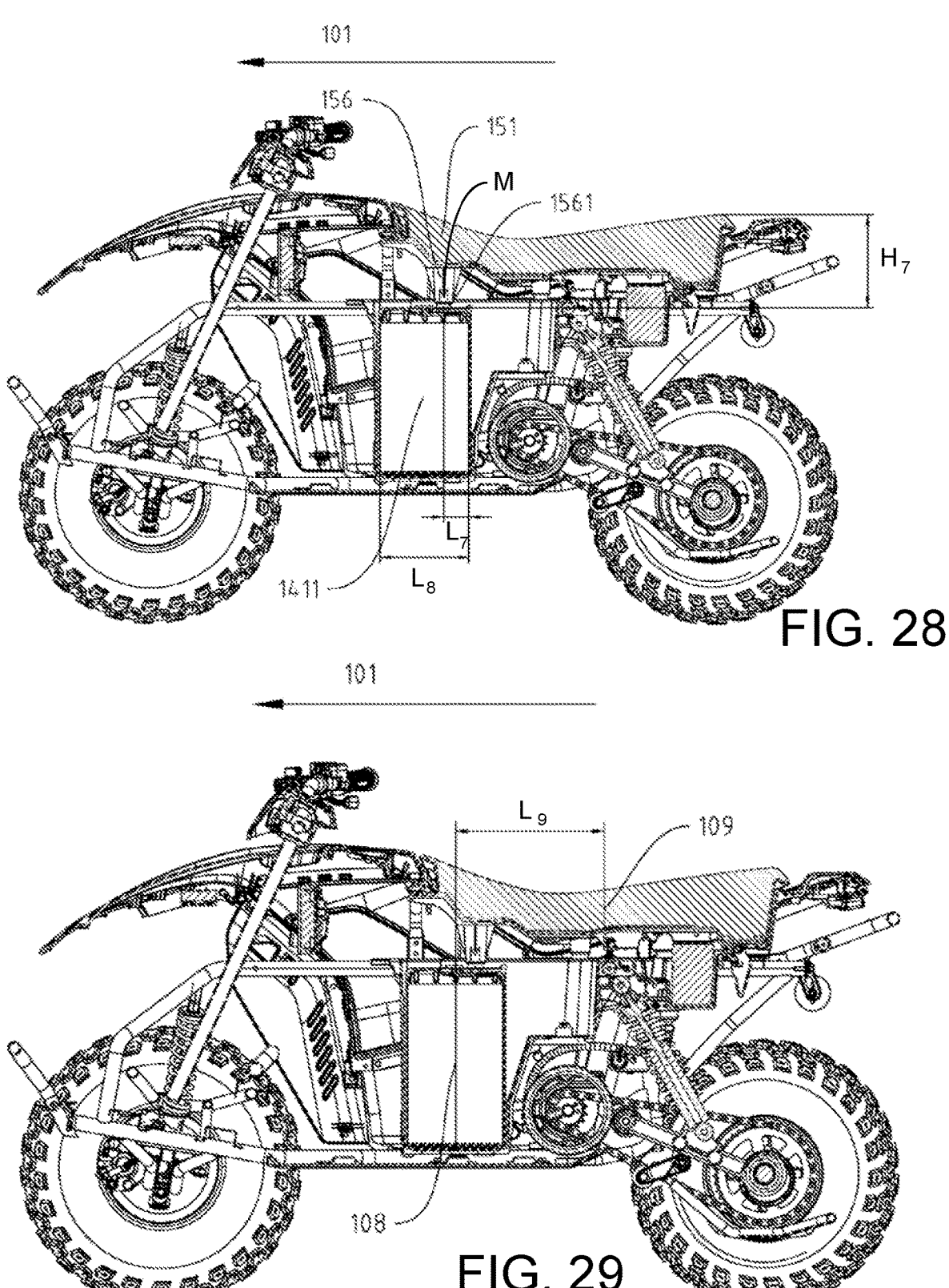
FIG. 28 is the cross-sectional view of FIGS. 2, 13, 16, 17, 19, 20 and 24, calling out the position of the power supply stopper load point.
FIG. 29 is the cross-sectional view of FIGS. 2, 13, 16, 17, 19, 20, 24 and 28, calling out the position of the longitudinal midpoints of the saddle assembly and main power supply.

The center of contact between the power supply stopper(s) 156 and the surface of the main power supply 1411 is defined as a stopper load point M called out in FIG. 28. The stopper load point M is preferably located on the top surface of the main power supply 1411 at or rearward of the longitudinal midpoint of the main power supply 1411. In other words, with the longitudinal distance from the stopper load point M to the rear edge of the main power supply 1411 defined as L7 and the length of the main power supply 1411 defined as power supply length L8, the ratio of L7 to power supply length L8 is preferably in the range from 0 to 0.5, more preferably in the range from 0.25 to 0.5. The vertical distance from the stopper load point M to a rear top of the saddle assembly is defined as H7, and H7 is preferably greater than or equal to 30 mm, more preferably greater than or equal to 50 mm. The hold force between the power supply stopper(s) 156 and the main power supply 1411 is not only from the weight of the saddle assembly 15 itself, but also from the weight of the driver. Therefore, the number of the power supply stopper(s) 156 and the contact area between the power supply stopper(s) 156 and the main power supply 1411 may be selected based not only on the weight of the saddle assembly 15, but also based on the geometry of the saddle assembly 15 (mechanical advantage obtained based on the location of stopper load point M relative to the centroid location of the saddle assembly 15 and the location of the saddle fixing flange 155) and expected weight and position of the driver. The pressure on the surface of the main power supply 1411 should be controlled within a safe range, so the main power supply 1411 can be held in place by the power supply stopper(s) 156 without causing damage to the surface of the main power supply 1411. The compressibility of the stopper buffer(s) 1561 helps to reduce the tolerances required for properly locating the various components of the saddle assembly 15 and properly locating the top surface of the main power supply 1411. The resiliency of the stopper buffer(s) 1561 also helps to raise the rear end of the saddle assembly 15 when the saddle locking hook 153 is unlatched. Alternative embodiments use two, three or four power supply stoppers 156 to ensure the safety of the main power supply 1411 without overly increasing cost. Other alternative embodiments attach the stopper buffer(s) to the top surface of the main power supply 1411 rather than to the bottom(s) of the power supply stopper(s) 156.

In order to balance the front and rear weight distribution of the all-terrain vehicle 100, the main power supply 1411 is preferably arranged at or in front of the center of gravity of the frame 11. At the same time, the longitudinal center of the saddle assembly is preferably arranged behind the center of gravity of the frame 11. The distance from the longitudinal midpoint of the main power supply 1411 to the longitudinal midpoint of the saddle assembly 15 is defined as L9 as called out in FIG. 29, and L9 is preferably in the range from 200 mm to 300 mm, more preferably in the range from 225 mm to 275 mm, and most preferably in the range from 235 mm to 265 mm.

In the preferred embodiment, a saddle cover 152 covers the saddle 151, and FIG. shows an aspect of the preferred saddle cover 152. The saddle cover 152 includes a contact portion 1521 and a pressure sensor 1522 located in the contact portion 1521. The pressure sensor 1522 monitors the saddle cover 152 and delivers an electrical signal indicating a no-pressure state or a pressed state to the control unit 24. A heating component 1523 electrically connected to the control unit 24 is arranged in the contact portion 1521 of the saddle cover 152. When the control unit 24 receives a signal from the pressure sensor 1522 indicating a no-pressure state, that is, when the pressure sensor 1522 detects little or no pressure because the driver is not seated on the saddle assembly 15, the control unit 24 keeps the heating component 1523 off. The control unit 24 controls the heating component 1523 to heat the saddle cover 152, preferably always whenever the pressure sensor signal indicates a pressed state or alternatively sometimes when the pressure sensor signal indicates a pressed state and based on other inputs and controls such as a heating element on/off switch (not shown) on the drive control assembly 22 or elsewhere on the vehicle 100. The pressure sensor 1522 and the heating component 1523 are integrated into the saddle cover 152 of the saddle assembly 15. When the driver leaves the saddle assembly 15, the control unit 24 controls heating component 1523 to automatically stop working and stop heating the saddle cover 152 regardless of other settings on the vehicle 100.

The signal from the pressure sensor 1522 is preferably also used for other purposes. For instance, when the pressure sensor 1522 detects the no pressure state, if the control unit 24 receives additional signals that the all-terrain vehicle 100 is in an unlocked state or non-parking state, then the control unit 24 controls the lamps 21 of the all-terrain vehicle 100 to emit light or light prompts, or allows the horn of the all-terrain vehicle 100 to emit sound. The driver may then park and/or lock the vehicle 100 in response to the light prompt and/or sound before leaving the area of the vehicle 100.

In some embodiments, the all-terrain vehicle 100 can be remotely controlled using a remote interaction unit (not shown) of the all-terrain vehicle 100 which sends wireless signals to a smartphone (not shown) or other remote device (not shown) that has been paired with/connected to the all-terrain vehicle 100. The remote interaction unit of the all-terrain vehicle 100 can receive remote signals to cause the control unit 24 to turn on the heating component 1523 in advance of the driver sitting on the saddle assembly 15 and activating the pressure sensor pressed signal, to preheat the saddle cover 152 to ensure a pleasant use experience in low temperature environments.

The charging port 143 for on-board charging the main power supply 1411 is accessible through the vehicle cover 13, such as through the front cowl 136 at a location just in front of the saddle assembly 15. A charger cover 135 for covering the charging port 143 is arranged to protect the charging port 143. The preferred charger cover 135 is further shown in FIGS. 31-33. The charger cover 135 includes a cover mounting base 1351 supporting a hinge pin 1352, a damping block 1353, and a cover plate 1354 integrally formed with a hinge arm 1355 and a knuckle 1356. The cover mounting base 1351 is fixed preferably on the vehicle cover 13 or alternatively on the frame 11, such as with the cover plate 1354 being generally in plane with a portion of the vehicle cover 13 so as to aesthetically match the look of the vehicle cover 13. The knuckle 1356 receives the hinge pin 1352 so as to pivotally attach the cover plate 1354 to the cover mounting base 1351. The damping block 1353 is mounted on the cover mounting base 1351 in contact with the knuckle 1356. When in its closed position, the cover plate 1354 covers the charging port 143. The cover mounting base 1351 has a limit structure 1357, which is used to limit the opening angle β of the hinge arm 1355, thereby limiting the opening angle β of the cover plate 1354 to be less than or equal to 90°. The hinge arm 1355 is preferably an eccentric structure, allowing the limit structure 1357 to cover the knuckle 1356

Figures 31, 32, 33:
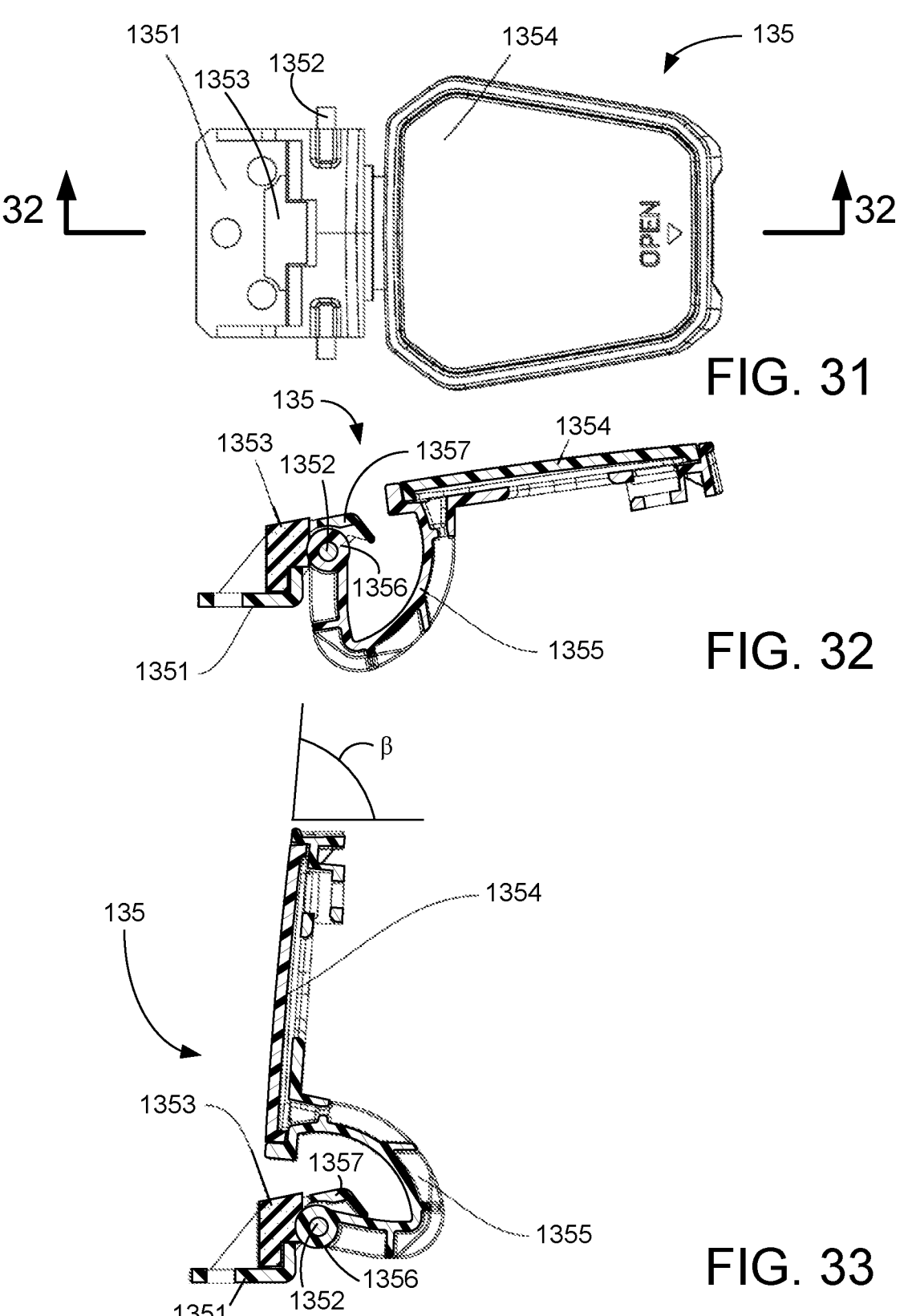
FIG. 31 is a top plan view of a charger cover of the all-terrain vehicle of FIGS. 1-3.
FIG. 32 is a side cross-sectional view of the charging cover of FIG. 31 in a closed state, taken along the cut line 32-32 in FIG. 31.
FIG. 33 is a side cross-sectional view of the charger cover of FIGS. 31 and 32 in an open state.

When the charger cover 135 is in the closed state, the cover plate 1354 covers the charging port 143. When the charger cover 135 is in the open state (as shown in FIG. 33), the cover plate 1354 is flipped up and the charging port 143 is exposed. The damping block 1353 is formed of a compressible material which compresses against and frictionally engages the knuckle 1356. The damping block 1353 is preferably made of a rubber material which has good elasticity and a high coefficient of friction with various material surfaces. The frictional force created on the knuckle 1352 can support the weight of the cover plate 1354, such that the cover plate 1354 can achieve hovering at any intermediate position that it is placed within the opening angle R. If desired, the knuckle 1352 may have an outer surface which is ovular or cam shaped so the amount of deformation of the damping block 1353 changes during movement of the cover plate 1354 from the closed state to the open state, thereby better matching the gravitational moment of the cover plate 1354 about the hinge pin axis. The maximum deformation size of the damping block 1353 is preferably in the range from 0.3 mm to 0.5 mm, and more preferably in the range from 0.35 mm to 0.45 mm. When the degree of compression between the knuckle 1352 and the damping block 1353 is too small, the frictional force between the knuckle 1352 and the damping block 1353 is too small relative to the gravitational force on the cover plate 1354 to hold the cover plate 1354 hovering at any position. When the degree of compression between the knuckle 1352 and the damping block 1353 is too large, the pressure between the knuckle 1352 and the damping block 1353 is too high, which will cause difficulty in rotating and opening the cover plate 1354. Therefore, the degree of compression between the knuckle 1352 and the damping block 1353 should be selected in an appropriate range, which not only ensures that knuckle 1352 can hover at any position within the opening angle θ, but also ensures that difficulty of cover plate pivoting is not overly increased.

Figure 34:
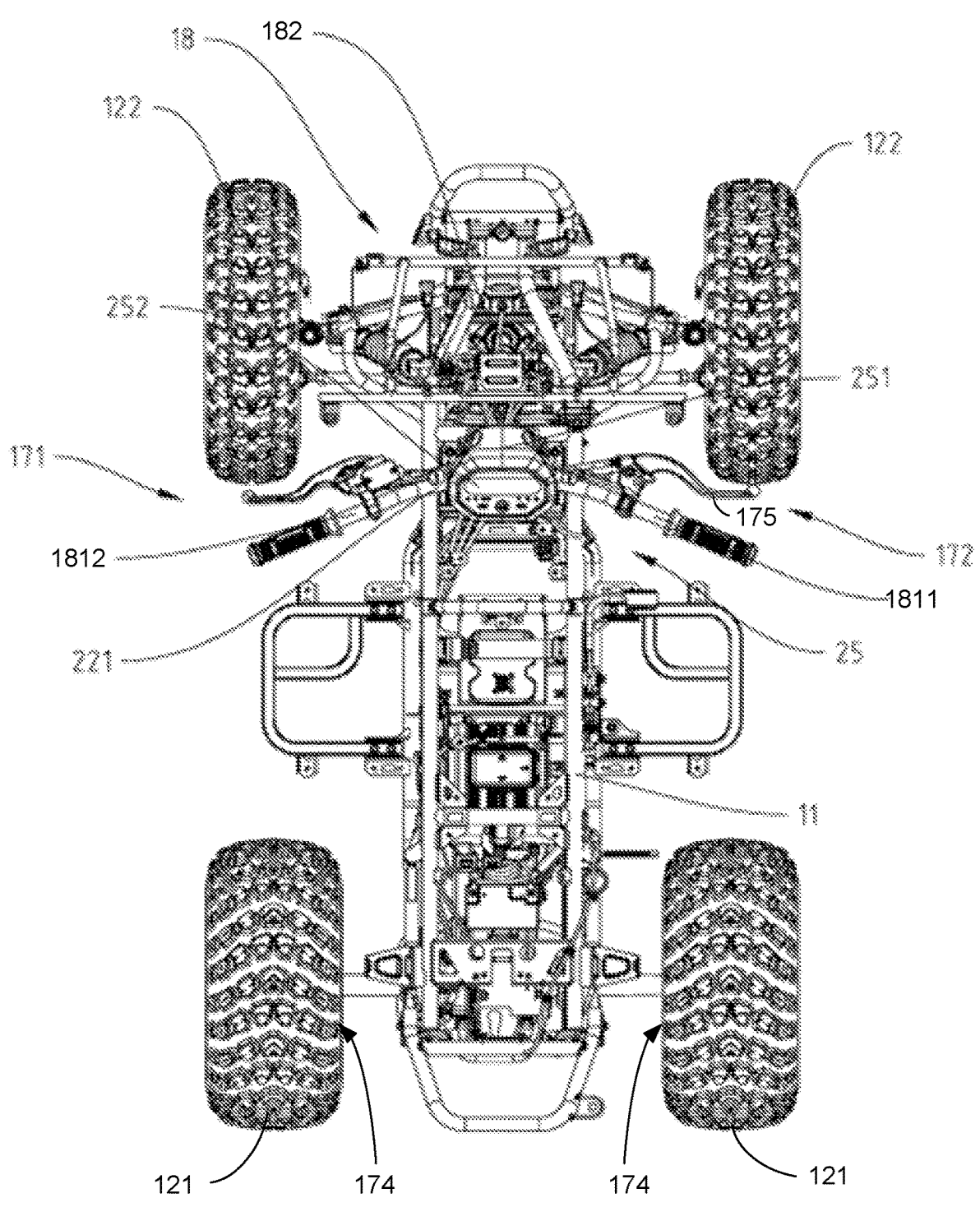
FIG. 34 is the top plan view of FIG. 9, with reference numerals calling out different components.

As called out in FIG. 2, the steering assembly 18 of the preferred all-terrain vehicle 100 includes a steering shaft 182 coupled to the handlebar 181. As called out in FIGS. 34 and 35, the handlebar 181 includes a right grip 1811 and a left grip 1812 for pivoting the steering shaft 182 about its longitudinal axis 1821 to turn the front wheels 122.

The instrument assembly 25 is preferably arranged on handlebar 181. The instrument assembly 25 includes an instrument body 251 having a display screen 252, which is mainly used to display running information and status information related to the all-terrain vehicle 100. If desired, an input device 221 (such as including one or more push buttons) of the drive control assembly 22 may also be incorporated and mounted on the instrument body 251.

The display screen 252 should be within the driver's visual range (especially the driver's optimal visual range), preferably perpendicular or close to perpendicular to the driver's direction of viewing and preferably located transversely at or near the longitudinal center plane the vehicle 100, so that the driver can more easily and clearly obtain the information displayed by the instrument assembly 25. Arranging the instrument body 251 on the center of the handlebar 181 avoids possible obstruction of the handlebar 181 to the instrument assembly 25, and can facilitate the driver's reading of information on the display screen 252. However, the exact direction of viewing varies for drivers of different body shapes and sizes. The instrument body 251 can preferably be pivoted about a transverse axis of the center section of the handlebar 181 by a certain angle range so as to allow adjustment of the display angle of the display screen 252, which can better meet a wide variety of drivers' demands for information display and improve the safety of the all-terrain vehicle 100. At the same time, the display screen 252 also pivots with the handlebar 181 when the driver turns the vehicle 100, which makes reading of information easier during steering and improves the visual effect of the instrument assembly 25. Arranging the display screen 252 on the handlebar 181 can also shorten the distance between the driver and the instrument body 251, making it easier for the driver to operate any input device 221 on the instrument body 251. In addition, mounting all or a substantial portion of the instrument assembly 25 on the handlebar 181 can simplify the vehicle body structure, reducing weight of the all-terrain vehicle 100, and saving space on the all-terrain vehicle 100 for other components, especially important for child-sized all-terrain vehicles.

Figures 35, 36:
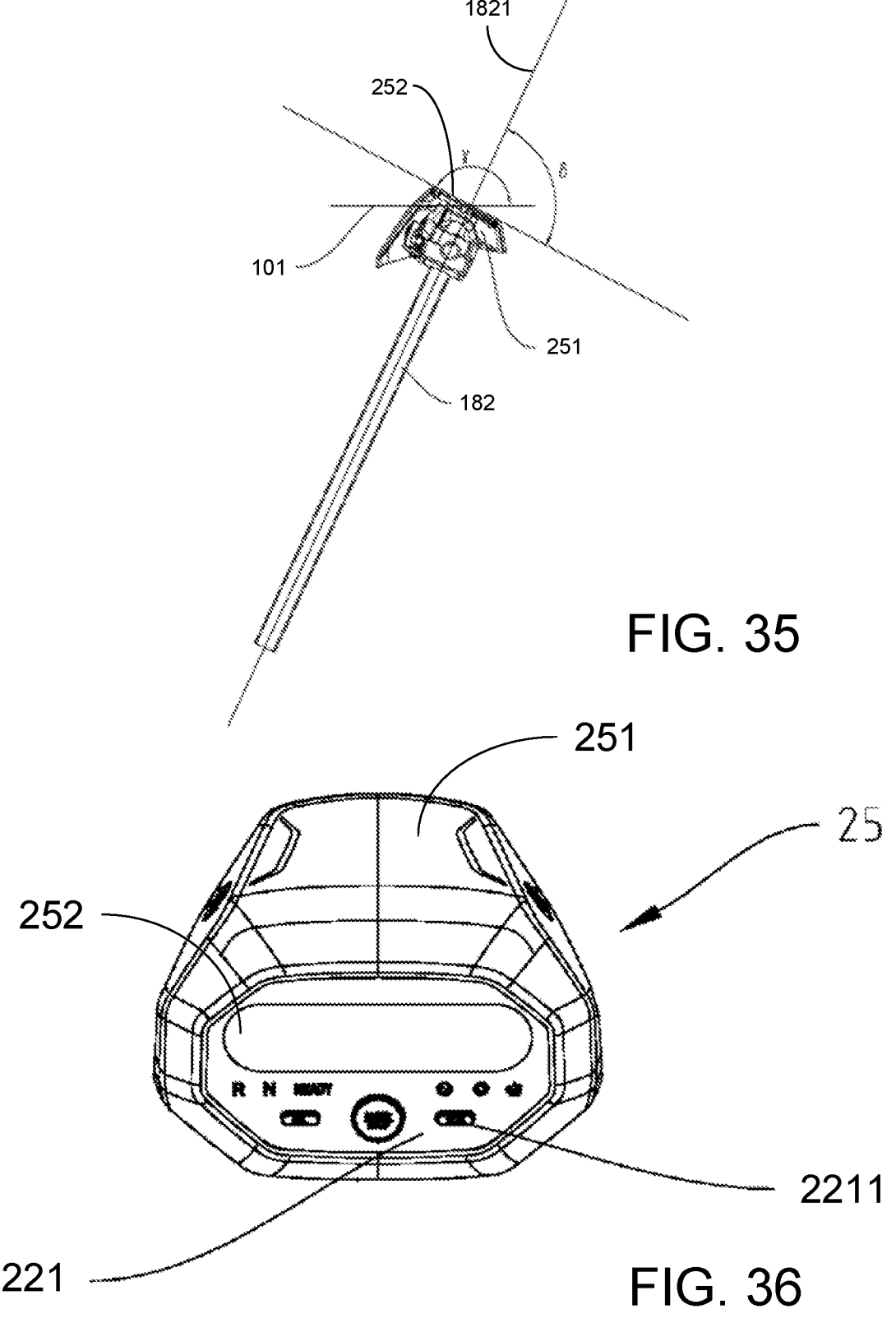
FIG. 35 is a side cross-section view of a steering shaft and instrument body of the all-terrain vehicle of FIGS. 1-3.
FIG. 36 is a top plan view of the instrument body of FIG. 35.

As shown in FIG. 35, the display angle of the display screen 252 can be characterized either relative to horizontal as shown by angle γ or relative to the steering shaft axis 1821 as shown by angle δ. The display angle γ relative to horizontal is equal to the supplementary angle to the display angle δ relative to the steering shaft axis 1821 plus the angle of the steering shaft axis 1821 relative to horizontal. For a display screen 252 which is fixed on the handlebar 181, the display angle γ relative to horizontal is preferably in the range from 90° to 180°, more preferably in the range from 130° to 170°, and most preferably in the range from 145° to 155°. The display angle δ relative to the steering shaft axis 1821 is preferably in the range from 25° to 115°, more preferably in the range from 60° to 100°, and most preferably in the range from 80° to 90°. For a display screen 252 which allows pivoting relative to the handle bar 181, the display screen 252 can preferably be pivoted throughout these ranges of display angles γ and δ. The orientation of the display screen 252 affects whether the driver can effectively see information displayed by the instrument assembly 25 during the running of the all-terrain vehicle 100.

In the preferred embodiment, the input device 221 includes an emergency call push button 2211 called out in FIG. 36. The emergency call button 2211 is electrically connected to the control unit 24. When the emergency call button 2211 is pressed, the control unit 24 controls the all-terrain vehicle 100 to send warning information and/or send emergency call information to a remote device (not shown) such as police and/or emergency response teams in the area. When the emergency call button 2211 is pressed, the control unit 24 also controls the lamps 21 and/or horn and other audible components of the all-terrain vehicle 100 to send an alarm signal so that surrounding people can detect the emergency situation of the driver.

Figures 37, 38:
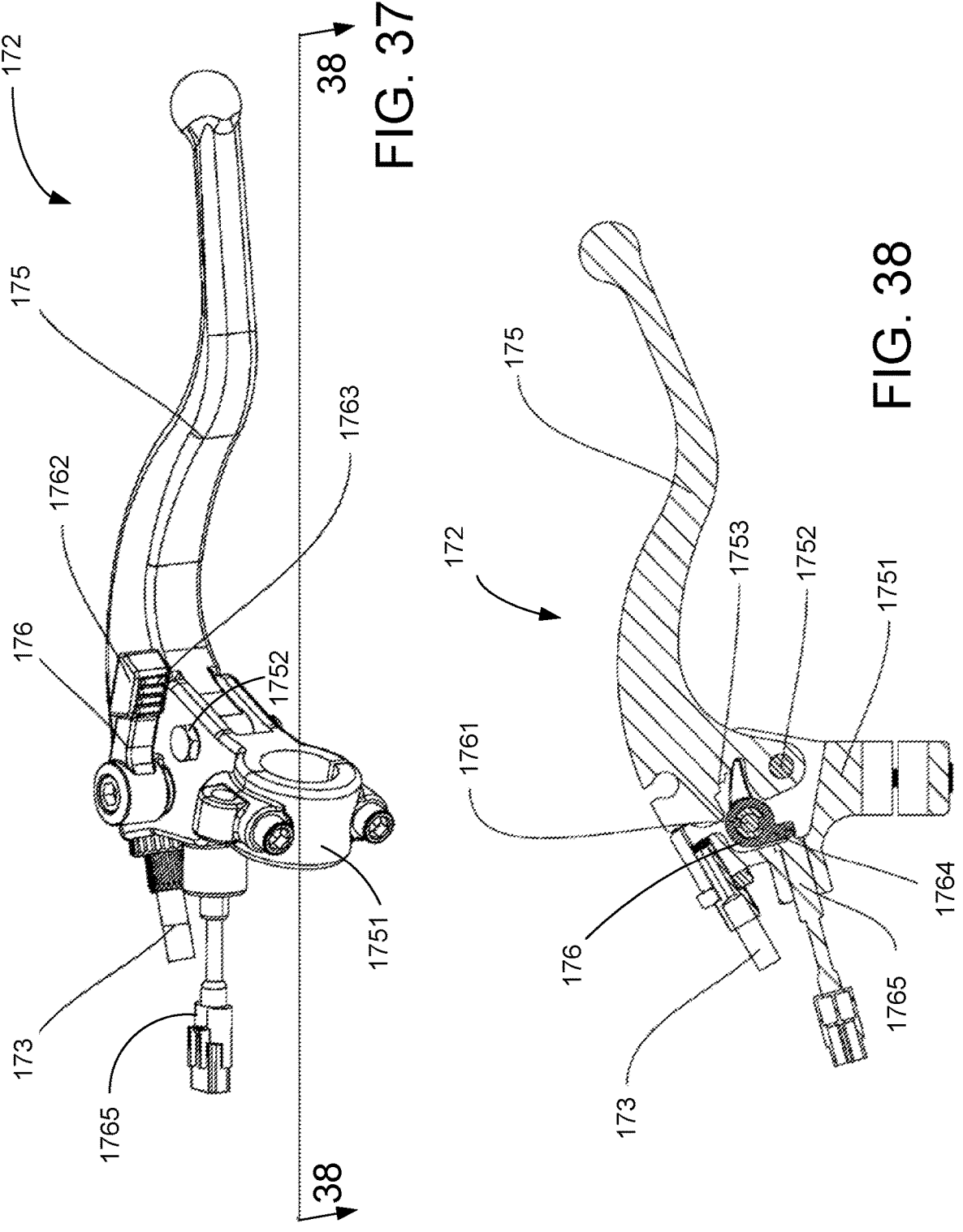
FIG. 37 is a perspective view of a right handbrake lever of the all-terrain vehicle of FIGS. 1-3.
FIG. 38 is a cross-sectional view along cut line 38-38 in FIG. 37.

In the preferred embodiment, the brake system 17 includes a left handbrake assembly 171 and a right handbrake assembly 172 (both called out in FIG. 3) each attached to the handlebar 181, with the preferred right handbrake assembly 172 better shown in FIGS. 37 and 38. The right handbrake assembly 172 is connected to a brake cable 173, internal movement of which controls at least rear brakes 174 called out in FIG. 34. The right handbrake assembly 172 includes a hand brake lever 175 and a limiting pawl 176. The handbrake lever 175 is pivotally mounted relative to the handlebar 181 by a fixing tube 1751 and a lever pivot pin 1752. By squeezing the hand brake lever 175 toward the handlebar 181, the force on the hand brake lever 175 is transferred through the brake cable 173 to have the rear brakes 174 resist rotation of the rear wheels 121.

The limiting pawl 176 is used as a parking brake mechanism to prevent the all-terrain vehicle 100 from sliding after the driver parks the all-terrain vehicle 100. The limiting pawl 176 is pivotally mounted relative to the fixing tube 1751 by a pawl pivot pin 1761. The limiting pawl 176 is biased clockwise as shown in FIGS. 37 and 38 such as under the force of a torsion spring (not shown). With the hand brake lever 175 being squeezed by the right hand, the driver uses his or her left hand to press on the pawl handle 1762 to overcome the biasing force and move the limiting pawl 176 in a counterclockwise direction, until the limiting pawl 176 mates into one of a plurality of toothed limit grooves 1753. Having the limiting pawl 176 engage within a toothed limit groove 1753 prevents the hand brake lever 175 from releasing, holding the handbrake lever 175 in the squeeze (braking) position and thereby setting the parking brake. Having several toothed limit grooves 1753 allows the driver to set varying degrees of parking brake pressure. The pawl handle 1762 may have several anti-slip protrusions 1763 (as shown in FIG. 37) to indicate the direction of movement of the limiting pawl 176 and prevent slipping of the driver's left hand when pushing the limiting pawl 176 to the engaged position. The driver disengages the parking brake merely by resqueezing the hand brake lever 175, so the limiting pawl 176 snaps clockwise back to the position shown in FIGS. 37 and 38.

The preferred right handbrake assembly 172 has a set of switch contacts 1764 between the limiting pawl 176 and the fixing tube 1751 of the handbrake lever 175. The control unit 24 receives an electrical signal through signal wire connection 1765 indicating the position of the limiting pawl 176 based on the set of switch contacts 1764. When the limiting pawl 176 is in the released position shown in FIGS. 37 and 38, the control unit 24 preferably allows the all-terrain vehicle 100 to operate normally. However, when the electrical signal from the set of switch contacts 1764 indicates that the limiting pawl 176 is in the set (parking brake on) position, the control unit 24 preferably modifies the operation of the all-terrain vehicle 100, such as by preventing output power from the main power supply 1411 or locking the chain 161 of the transmission assembly 16. Because the engaged position of the limiting pawl 176 interrupts normal operation of the vehicle 100, the possibility of a driver running the vehicle 100 while the parking brake is engaged is avoided. Because the parking brake action of the limiting pawl 176 can only be engaged by a two handed operation of the driver (with the limiting pawl 176 being pushed by the left hand in the (counterclockwise) direction opposite the (clockwise) direction that the right hand is squeezing the handbrake lever 175), the parking brake cannot be mistakenly set, avoiding the possibility of stopping the power output of the main power supply 1411 or locking the chain 161 during running. The driver uses two hands to engage the limiting pawl 176 only when the driver really wants to park the all-terrain vehicle 100. Generally, the majority of users are right-handed users, and the all-terrain vehicle 100 is preferably designed with more operating devices (including the limiting pawl 176) on the right side of the all-terrain vehicle 100.

Figures 39, 40:
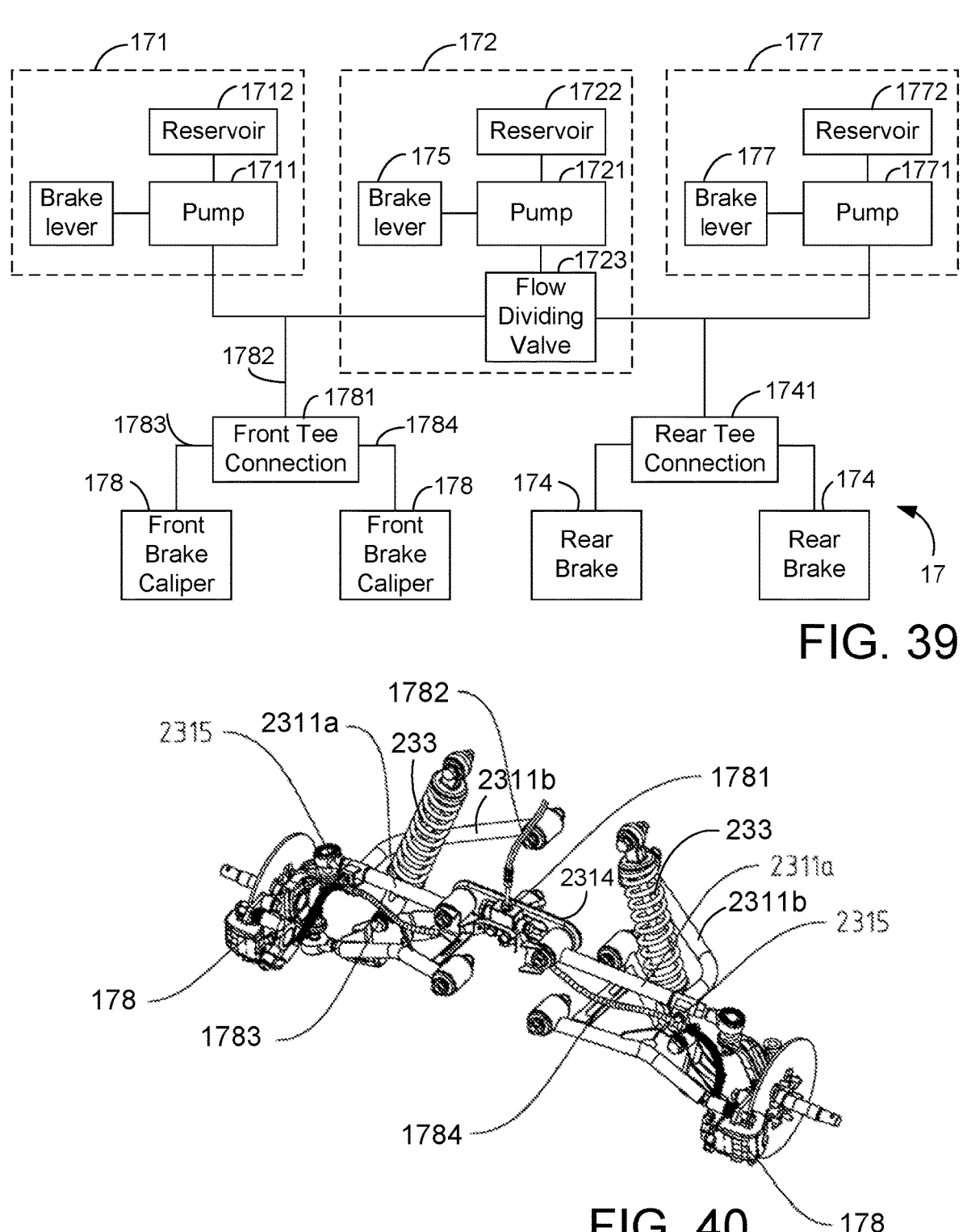
FIG. 39 is a schematic diagram of the layout of the braking system of the all-terrain vehicle of FIGS. 1-3.
FIG. 40 is a rear right perspective view the front suspension and front brakes of the all-terrain vehicle of FIGS. 1-3.

FIG. 39 is a schematic diagram of the preferred brake system 17. The brake system 17 includes the two handbrake assemblies 171, 172 as well as a foot-operated brake lever 177. A brake fluid delivery pump 1711, 1721, 1771 having an integrated brake fluid reservoir 1712, 1722, 1772 is operatively controlled by each of the handbrake assemblies 171, 172 and the foot-operated brake lever 177. Alternatively, the brake fluid reservoirs 1712, 1722, 1772 can be combined into a single reservoir (not shown) for all three brake fluid delivery pumps 1711, 1721, 1771. Each of the front wheels 122 has a front brake caliper 178, and each of the rear wheels 121 has a rear brake caliper 174, although drum brakes (not shown) may alternatively be used. The brake fluid output line for the right handbrake assembly 172 is connected first through a flow dividing valve 1723 so as to be directed both toward a tee connection 1781 for the front brake calipers 178 and toward a tee connection 1741 for the rear brake calipers 174. The foot-operated brake device 177 pumps brake fluid solely to the tee connection 1741 for the rear brake calipers 174. The brake fluid output line for the left handbrake assembly 172 solely connects to the tee connection 1781 for the front brake calipers 178.

FIG. 40 shows a preferred location for the front tee connection 1781. Brake fluid from the input brake fluid pipe 1782 is divided into two channels through the front tee connection 1781, then the two channels of the brake fluid are respectively input into the two different front calipers 178 through a left branch brake fluid pipe 1783 and a right branch brake fluid pipe 1784 for braking the front wheels 122. The front tee connection 1781 is preferably arranged on the rocker arm mounting bracket 2314. The branch brake fluid pipes 1783, 1784 are preferably mounted on the upper rocker A-arm assemblies 2311 through a brake fluid pipe mounting seat 1785 located near the position where the upper rocker A-arm assemblies 2311 are pivotally attached to the front wheels 121. The vertical distance between the front tee connection 1781 and the horizontal plane containing the front wheel axes is preferably in the range from −60 mm to 60 mm, more preferably in the range from −40 mm to 40 mm, and most preferably in the range from −20 mm to 20 mm. The front end of the front brake fluid three-way tee connection 1781 is behind the front end of the frame 11, and the rear end of the front tee connection 1781 is in front of the rear end of the steering shaft 182. Positioning the front tee connection 1781 at a location within these ranges provides shorter brake line runs 1783, 1784 which are relatively equal in length and volume between the front calipers 178, achieving a more consistent and equal braking force, simplifying the brake pipe layout structure, making the brake pipe structure more streamlined and reasonable.

Figure 41:
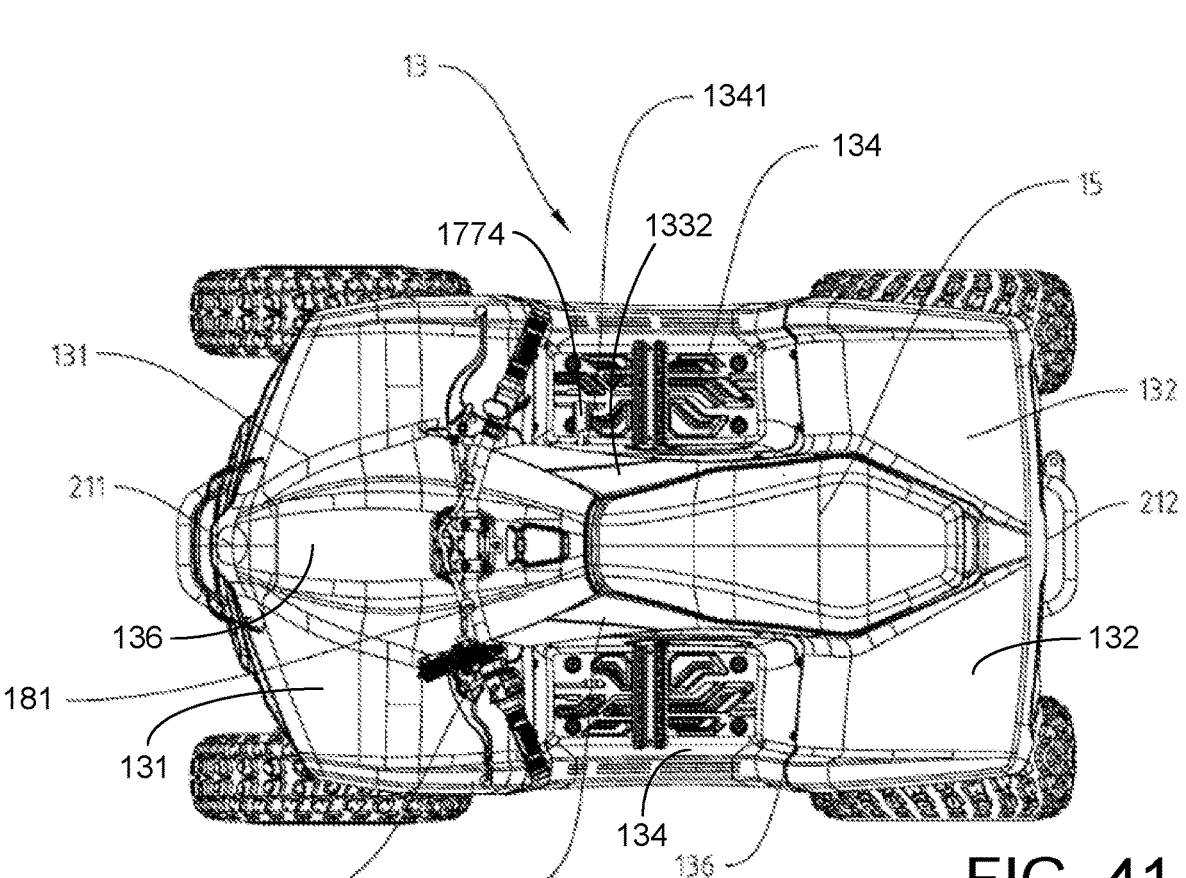
FIG. 41 is the top plan view of FIGS. 3 and 26, calling out the brake foot pedal and lamps.
Figure 42:
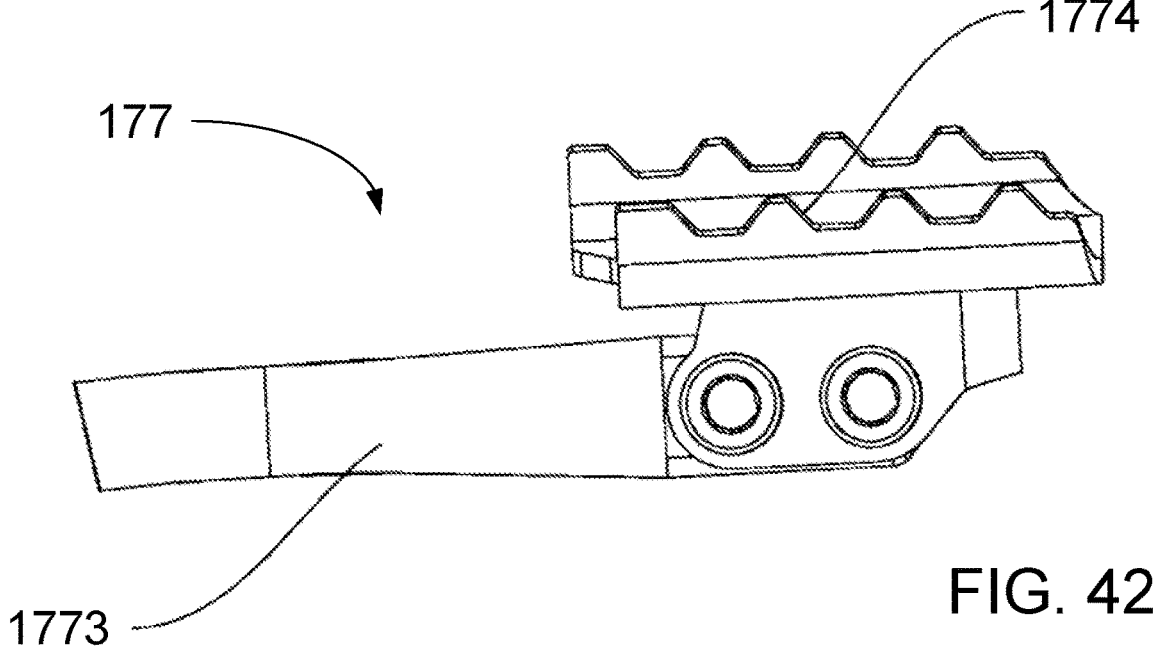
FIG. 42 is a rear view of the brake foot pedal of FIG. 41.

FIGS. 41 and 42 indicate the position and structure of the foot operated brake lever 177. The foot operated brake lever 177 is preferably positioned at the front end of the right footplate 134, for operation by the driver's right foot. The foot-operated brake lever 177 is preferably made with a foot brake pedal arm 1773 which is separately formed from a foot brake pedal 1774, with the foot brake pedal 1774 connected to the foot brake pedal arm 1773 through bolts. The foot brake pedal arm 1773 and the foot brake pedal 1774 are preferably both formed of a strong metal such as steel, with the foot brake pedal having a ridged top surface, so as to withstand and have traction against the driver's footgear or boot. The right footplate 134 includes a pedal arm opening 1341, with the foot brake pedal arm 1773 extending through the pedal arm opening 1341.

The vehicle cover 13, including the front fender 131, the rear fender 132, the two side guards 1331, 1332, the two foot plates 134, the charger cover 135 and the front cowl 136 are preferably all formed primarily of plastics. With the size of the all-terrain vehicle 100 being relatively small, in order to save injection costs, the front cowl 136 can be integrally molded with the two front fenders 131 into a single structure, to enhance the structural rigidity, simplify the assembly process, improve the assembly efficiency, and reduce the production cost of the all-terrain vehicle 100. During assembly, the foot plate 134 can be assembled onto the frame 11 together with other plastic parts of the body cover 13 in advance, with the foot brake pedal arm 1773 extending through the pedal arm opening 1341. The foot brake pedal 1774 can be mounted at a later time on to the foot brake pedal arm 1773. The pedal arm opening 1341 is smaller than would be needed if the foot brake pedal 1774 was formed with the foot brake pedal arm 1773 as a single integrated structure, which improves the strength of the plastic right foot plate 134.

Figures 43, 44:
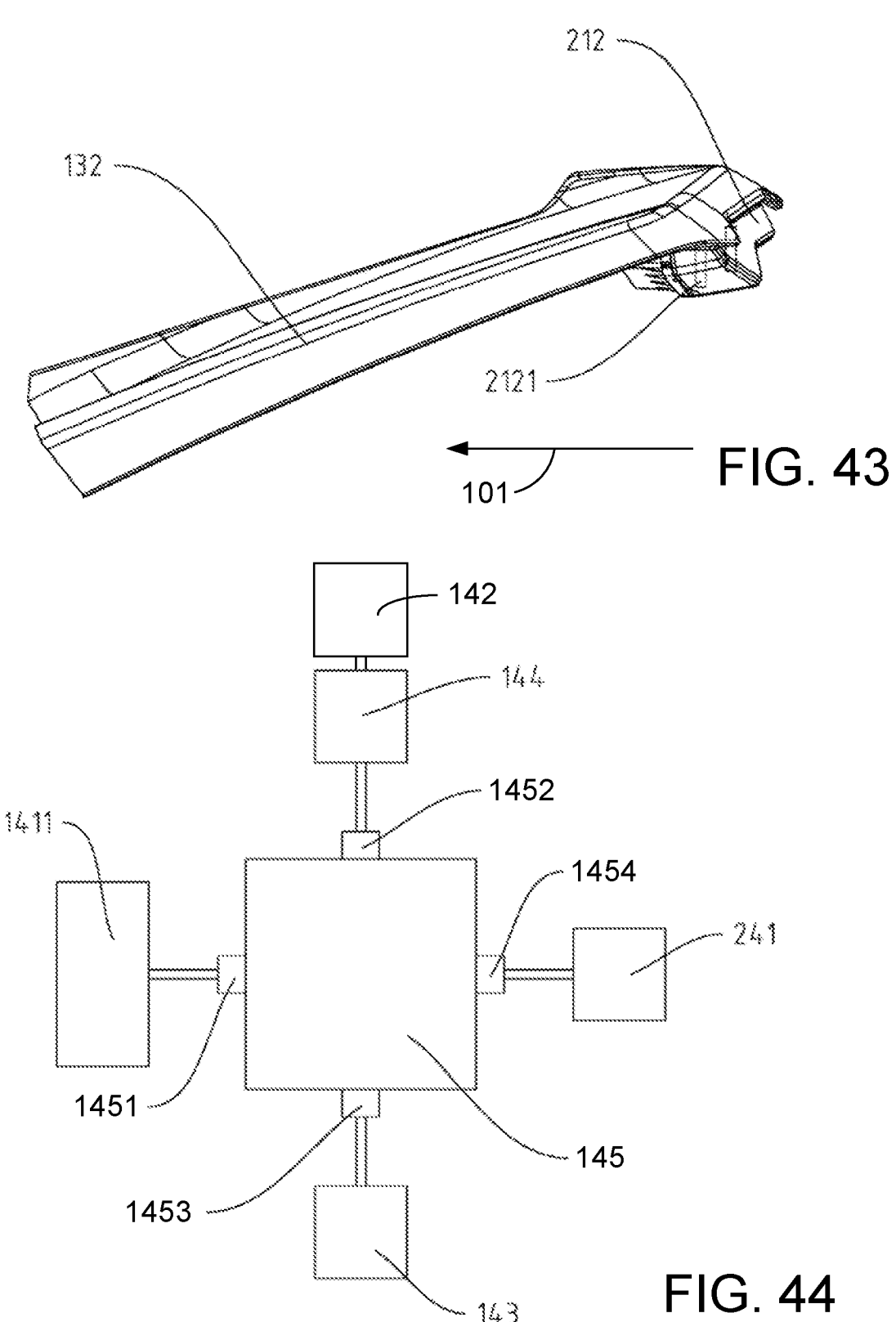
FIG. 43 is a left side view of the left rear fender and tail lamps of the all-terrain vehicle of FIGS. 1-3.
FIG. 44 is a schematic diagram of a high-voltage junction unit of the all-terrain vehicle of FIGS. 1-3.

The plurality lamps 21 include at least one head lamp 211 and at least one tail lamp 212, both called out in FIGS. 3 and 41. FIG. 43 better shows how the tail lamp(s) 212 attach in to the rear fender 132. As shown in FIG. 43, a plurality of tail lamp mount holes 2121 are formed at the rear end of the rear fender 132. The centerline of each of the plurality of tail lamp mount holes 2121 is not horizontal, nor perpendicular to the surface of the rear fender 132 that the holes 2121 extend through, but rather is vertical (perpendicular to the ground reference plane 107). Each tail lamp 212 is fixed and mounted at the end of the rear fender 132 through the plurality of tail lamp mount holes 2121, with an insertion direction which is vertical. For the small all-terrain vehicle 100, assembly and maintenance personnel can assemble and/or disassemble the tail lamp 212 to/from the rear fender 132 without squatting deeply, which is more convenient for maintenance.

Various aspects of the power supply system 14 including the main power supply 1411, the auxiliary power supply 142 and the charging port 143 have been described previously such as in connection with FIGS. 16-18, as has the motor control unit 241. The main power supply 1411, the charging port 143 and the motor control unit 241 all handle high voltages. The auxiliary power supply 142 handles low voltage, but is powered from the main power supply 1411 through a DC-DC module 144 which has a high voltage side. Electrical connections for these various high voltage components of the power supply system 14 must be reliable, and FIG. 44 schematically shows a high voltage junction unit 145 used in the preferred embodiment to make such high voltage connections. The high-voltage junction unit 145 is arranged at the top end of the main power supply 1411, connecting to the main power supply 1411 through a main power supply terminal interface 1451. The high-voltage distribution unit 145 also includes a DC-DC module terminal interface 1452 for electrically connecting the DC-DC module 144, a charging terminal interface 1453 for connecting the charging port 143, and a motor control unit terminal interface 1454 for connecting the motor control unit 241. Inside the high-voltage distribution unit 145, the DC-DC module terminal interface 1452, the charging terminal interface 1453, and the motor control unit terminal interface 1454 are respectively connected to the main power supply terminal interface 1451 through corresponding wiring terminals. Each connection point is encapsulated internally inside the high-voltage distribution unit 145, thereby ensuring the reliability of the electrical connection between the main power supply 1411 and other units 143, 144, 241, while reducing the problem of messy external wirings at the top end of the main power supply 1411.

Workers of ordinary skill in the art may make numerous modifications and improvements without departing from the concepts of the present invention. Therefore, the protection scope of the patent of the present invention is defined to include the full breadth of the appended claims.

The invention claimed is:

1. An all-terrain vehicle, comprising:
   a frame;
   a vehicle cover partially connected to the frame;
   a plurality of wheels comprising two rear wheels and two front wheels jointly defining a ground reference plane and a vertical direction perpendicular to the ground reference plane, the two rear wheels rotating about a rear wheel axis; a drive system comprising a drive motor for driving at least one of the rear wheels or the front wheels, the drive motor having an output center point; a saddle assembly arranged on the frame; a power supply system located at least partially below the saddle assembly, the power supply system comprising a main power supply for supplying power to the drive motor;
   a suspension system comprising a front suspension and a rear suspension, the rear wheels being connected to the frame by the rear suspension and the front wheels being connected to the frame by the front suspension, and the rear suspension comprising at least one rear pivot arm defining a pivot arm projection line, the pivot arm projection line in a fully loaded position of the suspension system providing a fully loaded pivot arm angle in the range from 90° to 135° relative to vertical;

wherein the saddle assembly has a saddle locked state wherein the saddle assembly is fixed to the frame and a saddle unlocked state wherein the saddle assembly is movable relative to the frame to allow access to the main power supply for removing the main power supply from the all-terrain vehicle wherein a line running between the rear wheel axis and the output center point of the drive motor provides a fully loaded rear drive angle in the range from 90° to 120° relative to vertical; and wherein the saddle assembly comprises:

a saddle running for a saddle length of 0.3 to 0.48 times a length of the all-terrain vehicle;

a saddle locking hook having a position which can secure the saddle in the saddle locked state;

a saddle fixing flange arranged in front of the saddle locking hook; and a power supply stopper exposed on a bottom of the saddle between the saddle locking hook and the saddle fixing flange, the power supply stopper being in contact with the main power supply while the saddle assembly is in the saddle locked state so as to prevent the main power supply from moving vertically relative to the frame when the saddle assembly is in the saddle locked state.

2. The all-terrain vehicle of claim 1, wherein a projection of the main power supply projected on the ground reference plane is defined as a power supply projection, a projection of the drive motor projected on the ground reference plane is defined as a drive motor projection, and a projection of the saddle assembly projected on the ground reference plane is defined as a saddle projection, with the power supply projection being smaller than and at least partially within the saddle projection and the drive motor projection being smaller than and at least partially within the saddle projection.

3. The all-terrain vehicle of claim 1, wherein the frame comprises:

a top horizontal section comprising two top main beams; and a saddle support base projecting upwardly and detachably connected to the two top main beams bracket; and wherein the saddle fixing flange engages with the saddle support base of the frame in the saddle locked state.

4. The all-terrain vehicle of claim 1, further comprising a drive motor support cradle for securing the drive motor, the drive motor support cradle having an upper drive motor mount rack and a lower drive motor mount rack, the upper drive motor mount rack having a connection crossbar which is detachably connected between two drive motor mounting brackets, the two drive motor mounting brackets being fixedly connected to a bottom horizontal section of the frame.

5. The all-terrain vehicle of claim 1, wherein the front suspension comprises a rocker arm mounting bracket, and wherein the all-terrain vehicle further comprises a brake system having a front tee connection for dividing brake fluid from an input brake fluid pipe to left and right branch brake fluid pipes delivering brake fluid to front brake calipers, wherein the front tee connection is mounted on the rocker arm mounting bracket.

6. The all-terrain vehicle of claim 5, wherein the brake system further comprises a hand-operated brake device powering brake fluid through a flow dividing valve to the input brake fluid pipe for the front tee connection as well as powering brake fluid to rear brakes.

7. The all-terrain vehicle of claim 5, wherein the brake system comprises a left handbrake assembly for braking at least the two front wheels, a right handbrake assembly for braking the two front wheels and the two rear wheels, and a foot-operated brake lever for braking at least the two rear wheels.

8. The all-terrain vehicle of claim 1, wherein the frame comprises:

a top horizontal section comprising two top main beams; and a rear crossplate extending between the two top main beams; and wherein the saddle assembly comprises:

the saddle locking hook in the saddle locked state mating with the rear crossplate at a location which is below a top of the saddle and accessible from behind the all-terrain vehicle.

9. The all-terrain vehicle of claim 8, wherein the saddle locking hook comprises:

a hook mounting base fixed at a bottom of the saddle;

a hook arm defining a latch opening;

a pivot pin pivotally attaching the hook arm to the hook mounting base;

a torsion spring biasing the hook arm relative to the hook mounting base; and a handle finger plate on the hook arm which allows the hook arm to open by pulling rearwardly on the handle finger plate.

10. The all-terrain vehicle of claim 1, wherein the saddle assembly comprises a pressure sensor and a heating component both in a saddle cover of a saddle, the pressure sensor and the heating component both electrically communicating with a control unit, the control unit controlling the heating component to stop heating when the pressure sensor indicates no pressure on the saddle cover.

11. The all-terrain vehicle of claim 10, wherein when the pressure sensor indicates no pressure on the saddle cover, then if the control unit detects that the all-terrain vehicle is in an unlocked state or the all-terrain vehicle is in a non-parking state, the control unit controls the all-terrain vehicle to emit a reminder light or sound.

12. The all-terrain vehicle of claim 1, wherein the main power supply is in a power supply compartment, and wherein a vertical distance from a top of the power supply compartment to the ground reference plane is in the range from 500 mm to 750 mm.

13. The all-terrain vehicle of claim 1, further comprising a braking system having a handbrake assembly, the handbrake assembly comprising:

a hand brake lever pivotally attached relative to a grip of a handlebar, such that squeezing the hand brake lever brakes at least one of the wheels; and a limiting pawl movable between a position where the limiting pawl releases the hand brake lever and a parking brake position where the limiting pawl engages the hand brake lever to hold the hand brake lever in a squeezed position.

14. The all-terrain vehicle of claim 13, wherein the limiting pawl pivots relative to the grip of the handlebar, with a pawl handle exposed to pivot the limiting pawl while the hand brake lever is being squeezed relative to the grip; and wherein the all-terrain vehicle further comprises a control unit which receives a signal indicating position of the limiting pawl, the control unit adjusting behavior of the all-terrain vehicle based on the parking brake position of the limiting pawl.

15. The all-terrain vehicle of claim 1, further comprising an instrument assembly having an instrument body with a display screen, the instrument body being adjustably mounted on a handlebar of the all-terrain vehicle so as to allow adjustment of a display angle of the display screen.

16. The all-terrain vehicle of claim 15, wherein the instrument assembly further comprises an information input device comprising an emergency call button electrically connected to a control unit, and wherein the control unit is capable of controlling the all-terrain vehicle to send emergency call information in response to pressing of the emergency call button, and wherein the control unit is adapted to control the all-terrain vehicle to emit a light or sound in response to pressing of the emergency call button.

17. The all-terrain vehicle of claim 1, wherein the vehicle cover comprises a charger cover over a charging port for electrically charging the main power supply, the charger cover including a damping block which can cause a cover plate of the charger cover to hover at a selected position within a range of cover angles over the charging port.

18. An all-terrain vehicle comprising:
a frame;
a vehicle cover partially connected to the frame;

a plurality of wheels comprising two rear wheels and two front wheels;
a drive system comprising a drive motor for driving at least one of the rear wheels or the front wheels;
a saddle assembly arranged on the frame;
a power supply system at least partially located below the saddle assembly, the power supply system comprising a main power supply for supplying power to the drive motor;
a suspension system comprising a front suspension and a rear suspension, the rear wheels being connected to the frame by the rear suspension and the front wheels being connected to the frame by the front suspension;
wherein the saddle assembly comprises:
a saddle;
a saddle locking hook having a position which can secure the saddle in the saddle locked state, the saddle locking hook being accessible from behind the all-terrain vehicle; and
a power supply stopper exposed on a bottom of the saddle, the power supply stopper being in contact with the main power supply while the saddle assembly is in the saddle locked state so as to prevent the main power supply from moving vertically relative to the frame when the saddle assembly is in the saddle locked state.

* * * * *